(12) United States Patent
Hasegawa et al.

(10) Patent No.: US 12,350,753 B2
(45) Date of Patent: Jul. 8, 2025

(54) METHOD FOR MONITORING WELDING OF ELECTRIC RESISTANCE WELDED STEEL PIPE, METHOD FOR MANUFACTURING ELECTRIC RESISTANCE WELDED STEEL PIPE, DEVICE FOR MONITORING WELDING OF ELECTRIC RESISTANCE WELDED STEEL PIPE, AND DEVICE FOR MANUFACTURING ELECTRIC RESISTANCE WELDED STEEL PIPE

(71) Applicant: NIPPON STEEL CORPORATION, Tokyo (JP)

(72) Inventors: Noboru Hasegawa, Tokyo (JP); Takashi Miyakawa, Tokyo (JP); Michimasa Mukai, Tokyo (JP); Toshisuke Fukami, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 940 days.

(21) Appl. No.: 17/422,542

(22) PCT Filed: Mar. 6, 2020

(86) PCT No.: PCT/JP2020/009584
§ 371 (c)(1),
(2) Date: Jul. 13, 2021

(87) PCT Pub. No.: WO2020/184414
PCT Pub. Date: Sep. 17, 2020

(65) Prior Publication Data
US 2022/0097163 A1    Mar. 31, 2022

(30) Foreign Application Priority Data

Mar. 13, 2019 (JP) ................................ 2019-045372
Mar. 13, 2019 (JP) ................................ 2019-045373

(51) Int. Cl.
*B23K 11/087* (2006.01)
*B23K 11/25* (2006.01)
(Continued)

(52) U.S. Cl.
CPC ........ *B23K 11/0873* (2013.01); *B23K 11/252* (2013.01); *B23K 11/36* (2013.01); *B23K 31/125* (2013.01); *B23K 2101/06* (2018.08)

(58) Field of Classification Search
CPC ... B23K 11/0873; B23K 11/25; B23K 11/252; B23K 11/36; B23K 2101/06; B23K 31/125
(Continued)

(56) References Cited

U.S. PATENT DOCUMENTS

| | | | |
|---|---|---|---|
| 2010/0232678 A1* | 9/2010 | Hasegawa ............... | B21C 37/08 382/141 |
| 2012/0325805 A1 | 12/2012 | Hasegawa et al. | |
| 2015/0090697 A1 | 4/2015 | Hasegawa et al. | |

FOREIGN PATENT DOCUMENTS

| | | |
|---|---|---|
| JP | 2005319473 A | 11/2005 |
| JP | 5014837 B2 | 8/2012 |

(Continued)

*Primary Examiner* — Dana Ross
*Assistant Examiner* — James F Sims, III
(74) *Attorney, Agent, or Firm* — GREER BURNS & CRAIN, LTD.

(57) ABSTRACT

A method for monitoring welding of an electric resistance welded steel pipe of the present invention includes: an image acquisition step in which, when an electric resistance welded steel pipe is welded, a V-convergence portion including an edge detection area and a V-convergence point, and a welding portion including a position where a molten steel starts to be discharged from an inside of a wall thickness and a bead, are imaged to obtain a captured image; a determination information acquisition step in which the captured image is image-processed, and a molten length from the (Continued)

V-convergence point to the position where the molten steel starts to be discharged or a molten width of the welding portion or a combination thereof is acquired as a determination information; and a determining step in which it is determined whether a cold welding has occurred by comparing the determination information with a determination threshold value set in advance for each wall thickness of the electric resistance welded steel pipe.

22 Claims, 19 Drawing Sheets

(51) Int. Cl.
*B23K 11/36* (2006.01)
*B23K 31/12* (2006.01)
*B23K 101/06* (2006.01)

(58) Field of Classification Search
USPC .................................................. 219/117.1
See application file for complete search history.

(56) References Cited

FOREIGN PATENT DOCUMENTS

| | | |
|---|---|---|
| JP | 55010615 B2 | 6/2014 |
| JP | 2015217420 A | 12/2015 |
| JP | 2016078056 A | 5/2016 |
| WO | 2011118560 A1 | 9/2011 |

* cited by examiner

METHOD FOR MONITORING WELDING OF ELECTRIC RESISTANCE WELDED STEEL PIPE, METHOD FOR MANUFACTURING ELECTRIC RESISTANCE WELDED STEEL PIPE, DEVICE FOR MONITORING WELDING OF ELECTRIC RESISTANCE WELDED STEEL PIPE, AND DEVICE FOR MANUFACTURING ELECTRIC RESISTANCE WELDED STEEL PIPE

This is a National Phase Application filed under 35 U.S.C. § 371, of International Application No. PCT/JP2020/009584, filed Mar. 6, 2020, the contents of which are incorporated by reference.

TECHNICAL FIELD

The present invention relates to a method for monitoring welding of an electric resistance welded steel pipe, a method for manufacturing an electric resistance welded steel pipe, a device for monitoring welding of an electric resistance welded steel pipe, and a device for manufacturing an electric resistance welded steel pipe.

Priority is claimed on: Japanese Patent Application No. 2019-045372, filed Mar. 13, 2019; and Japanese Patent Application No. 2019-045373, filed Mar. 13, 2019, the content of which is incorporated herein by reference.

BACKGROUND ART

In the related art, electric resistance welded steel pipes are manufactured by electric resistance welding. In electric resistance welding, an electric resistance welding phenomenon differs depending on an input power (heat input amount). An electric resistance welding phenomenon can be classified as a cold welding area, a type 1 area, a type 2 area, or an overheat input area. Among these, it is thought that stable welding quality under a wide range of heat input conditions is obtained in the type 2 area. However, as a result of comparing the quality focusing on the welding defects with detailed observation of the welding phenomenon, it has been found that the type 2 area is additionally subdivided into three areas. As shown in FIG. 21, these three areas can be defined as a type 2 area in a narrow sense, a transition area, and a type 2' area in order from the lowest heat input amount.

As shown in FIG. 22, when a welding portion is observed from above, a phenomenon different for each electric resistance welding phenomenon is observed. The type 1 area shows a phenomenon in which steel edges to be welded linearly converge on the welding point to form a V-convergence point, and no welding slit is generated. In the type 2 area in a narrow sense, the state of the steel edge is the same as that of the type 1 area, but a welding slit grows between the V-convergence point and the welding point, and an arc is generated therebetween. In the type 2' area, an actual collision point (physical collision point) is positioned downstream from the V-convergence point of the steel edge.

When a pair of steel edges approach each other, melting of these steel edges proceeds due to the proximity effect. Then, the physical collision point shifts due to a phenomenon in which a pair of steel edges converge in two stages (two-stage convergence). In addition, there is a transition area for heat input conditions interposed between the type 2 area in a narrow sense and the type 2' area. In this transition area, since a state in which a pair of steel edges linearly converge and a state in which a pair of steel edges converge in two stages appear irregularly, the number of welding defects is highly likely to increase. Here, a welding slit is generated under heat input conditions for the type 2 area or higher.

The inventors found that full-thickness melting can be obtained by two-stage convergence in the type 2' area, and constructed and introduced a system for controlling the state such that it is a heat input state in which the phenomenon in the type 2' area appears. For example, Patent Document 1 and Patent Document 2 disclose a system for controlling welding conditions such that they are appropriate conditions by measuring the length of a welding slit. In addition, Patent Document 3 discloses a technology for performing melt verification and heat input control by automatically detecting a two-stage convergent type 2 welding phenomenon and a technology for monitoring an upper limit of heat input by measuring a distance between a welding point position and a squeeze roll center (hereinafter referred to as an SQ roll center) (Patent Document 3, etc.).

So far, focusing on the generation of a welding slit and the two-stage convergence phenomenon, research mainly focusing on the welding state of a heat input area of the type 2 and higher has been conducted.

On the other hand, for example, in a small-diameter electric resistance welded steel pipe mill for manufacturing a small-diameter steel pipe with an outer diameter of φ114.3 mm (4½ inch) or less used for automobiles, machines and structures, the occurrence of a sputter is one cause of defects on the inner and outer surfaces of the steel pipe. When a sputter flies and adheres to the surface of the steel pipe, if the sputter is pushed by a roll, dents occur on the surface of the steel pipe. The occurrence of such dents is not preferable particularly for automobile steel pipes for which fatigue durability is required.

For this reason, it is necessary to perform a welding operation on the side with lower low heat input than that for the type 2 area in which sputters are inevitably generated, and it is necessary to accurately determine welding conditions for obtaining a "type 1 area where melt-welding is possible."

The "type 1 area where melt-welding is possible" is a narrow area positioned between the "type 2 area" on the high heat input side and the "type 1 area with cold welding" on the low heat input side, and only this area can be welded without sputtering and cold welding. A method of determining a boundary between the "type 1 area where melt-welding is possible" and the "type 2 area" on the high heat input side using the fact that arcing occurs within the welding slit at a high frequency is known. In addition, a method of determining a boundary between the "type 1 area where melt-welding is possible" and the "type 1 area with cold welding" on the low heat input side using the fact that the position of the V-convergence point slightly shifts to the downstream side as the heat input decreases is known. That is, when a threshold value (furthest downstream position) is set for an absolute position of the V-convergence point, the boundary between the "type 1 area where melt-welding is possible" and the cold welding limit is determined.

Incidentally, in the latter determination method of determining the low heat input side, it has been found that the absolute position of the V-convergence point varies depending on an upset force with which the SQ roll presses down the welded surface. This is because an amount of deformation of a softened part that is heated and melted by welding and reaches a high temperature changes in response to the change in the upset force.

As described above, the boundary between the type 1 area and the type 2 area on the high heat input side can be detected using the occurrence of an arc within the grown welding slit. On the other hand, it is still difficult to determine the boundary between the type 1 area and the cold welding occurrence limit on the low heat input side because there is no significant change in phenomena such as arc occurrence and two-stage convergence. Therefore, it is necessary to set the threshold value on the downstream side of the V-convergence point in consideration of the amount of change in the position of the V-convergence point due to an upset force, and an operation is performed with a relatively higher heat input than that of the actual boundary.

However, as described above, the "type 1 area where melt-welding is possible" is a very narrow area. Therefore, the operation on the high heat input side is not preferable for avoiding entering the type 2 area. For this reason, it is desired to perform the operation while performing monitoring to correctly determine the boundary between the "type 1 area where melt-welding is possible" and the cold welding limit.

CITATION LIST

Patent Document

[Patent Document 1] Japanese Patent No. 5014837
[Patent Document 2] PCT International Publication No. WO 11/118560
[Patent Document 3] Japanese Patent No. 5510615

SUMMARY OF THE INVENTION

Problems to be Solved by the Invention

The present invention has been made in view of the above circumstances, and an object of the present invention is to provide a method for monitoring welding of an electric resistance welded steel pipe and a device for monitoring welding of an electric resistance welded steel pipe through which cold welding can be detected in order to appropriately perform a welding operation in a type 1 area where melt-welding is possible. In addition, an object of the present invention is to provide a method for manufacturing an electric resistance welded steel pipe using the method for monitoring welding of an electric resistance welded steel pipe and a device for manufacturing an electric resistance welded steel pipe including the device for monitoring welding of an electric resistance welded steel pipe.

Means for Solving the Problem

In order to address the above problems and achieve the objects, the present invention provides the following aspects.

(1) A method for monitoring welding of an electric resistance welded steel pipe according to an aspect of the present invention, includes: an image acquisition step in which, when an electric resistance welded steel pipe is welded, a V-convergence portion including an edge detection area and a V-convergence point, and a welding portion including a position where a molten steel starts to be discharged from an inside of a wall thickness and a bead, are imaged to obtain a captured image; a determination information acquisition step in which the captured image is image-processed, and a molten length from the V-convergence point to the position where the molten steel starts to be discharged or a molten width of the welding portion or a combination thereof is acquired as a determination information; and a determining step in which it is determined whether a cold welding has occurred by comparing the determination information with a determination threshold value set in advance for each wall thickness of the electric resistance welded steel pipe.

(2) In the method for monitoring welding of an electric resistance welded steel pipe according to (1), in the determination information acquisition step, the molten length may be acquired as the determination information.

(3) In the method for monitoring welding of an electric resistance welded steel pipe according to (2), in the image processing in the determination information acquisition step, a high brightness area may be extracted by labeling an area downstream from the V-convergence point and the molten length may be then acquired.

(4) In the method for monitoring welding of an electric resistance welded steel pipe according to (2) or (3), the following may be applied: the wall thickness of the electric resistance welded steel pipe is 4.0 mm to 6.0 mm; and in the determining step, a result of whether the molten length is 1.5 mm or more is used as the determination threshold value.

(5) In the method for monitoring welding of an electric resistance welded steel pipe according to any one of (2) to (4), the determination threshold value in the determining step may be provided for each product type of the electric resistance welded steel pipe.

(6) In the method for monitoring welding of an electric resistance welded steel pipe according to (1), in the determination information acquisition step, the molten width may be acquired as the determination information.

(7) In the method for monitoring welding of an electric resistance welded steel pipe according to (6), in the image processing in the determination information acquisition step, a high brightness area may be extracted by labeling an area downstream from the V-convergence point, and the molten width may be then acquired.

(8) In the method for monitoring welding of an electric resistance welded steel pipe according to (6) or (7), the following may be applied: the wall thickness of the electric resistance welded steel pipe is 4.0 mm to 6.0 mm; and in the determining step, a result of whether the molten width is 0.3 mm or more is used as the determination threshold value.

(9) In the method for monitoring welding of an electric resistance welded steel pipe according to any one of (6) to (8), the determination threshold value in the determining step may be provided for each product type of the electric resistance welded steel pipe.

(10) A method for manufacturing an electric resistance welded steel pipe by molding a strip steel sheet into an open pipe while sending the strip sheet in a longitudinal direction and welding a gap between a pair of butt end surfaces, according to an aspect of the present invention includes performing the welding between a heat input lower limit operation condition in which a cold welding is not reached, which is obtained by the method for monitoring welding of an electric resistance welded steel pipe according to any one of (1) to (9), and a heat input upper limit operation condition in which no welding slit is generated on a downstream from the V-convergence point.

(11) The method for manufacturing an electric resistance welded steel pipe according to (10) may further include a marking step in which, when it is determined in the determining step that the cold welding has occurred, a position on the electric resistance welded steel pipe corresponding to the cold welding is marked.

(12) A device for monitoring welding of an electric resistance welded steel pipe, according to an aspect of the present invention includes: an imaging unit configured to image, when an electric resistance welded steel pipe is welded, a V-convergence portion including an edge detection area and a V-convergence point, and a welding portion including a position where a molten steel starts to be discharged from an inside of a wall thickness and a bead, to obtain a captured image; a determination information acquisition unit configured to perform image processing on the captured image and acquire a molten length from the V-convergence point to the position where the molten steel starts to be discharged or a molten width of the welding portion or a combination thereof as a determination information; and a determination unit configured to determine whether a cold welding has occurred by comparing the determination information with a determination threshold value set in advance for each wall thickness of the electric resistance welded steel pipe.

(13) In the device for monitoring welding of an electric resistance welded steel pipe according to (12), the determination information may be the molten length.

(14) In the device for monitoring welding of an electric resistance welded steel pipe according to (13), the determination information acquisition unit may acquire the molten length after a high brightness area is extracted by labeling an area downstream from the V-convergence point.

(15) In the device for monitoring welding of an electric resistance welded steel pipe according to (13) or (14), the following may be applied: the wall thickness of the electric resistance welded steel pipe is 4.0 mm to 6.0 mm; and the determination unit uses a result of whether the molten length is 1.5 mm or more as the determination threshold value.

(16) In the device for monitoring welding of an electric resistance welded steel pipe according to any one of (13) to (15), the determination unit may have the determination threshold value for each product type of the electric resistance welded steel pipe.

(17) In the device for monitoring welding of an electric resistance welded steel pipe according to (12), the determination information may be the molten width.

(18) In the device for monitoring welding of an electric resistance welded steel pipe according to (17), the determination information acquisition unit may acquire the molten width after a high brightness area is extracted by labeling an area downstream from the V-convergence point.

(19) In the device for monitoring welding of an electric resistance welded steel pipe according to (17) or (18), the following may be applied: the wall thickness of the electric resistance welded steel pipe is 4.0 mm to 6.0 mm; and the determination unit uses a result of whether the molten width is 0.3 mm or more as the determination threshold value.

(20) In the device for monitoring welding of an electric resistance welded steel pipe according to any one of (17) to (19), the determination unit may have the determination threshold value for each product type of the electric resistance welded steel pipe.

(21) A device for manufacturing an electric resistance welded steel pipe by molding a strip steel sheet into an open pipe while sending the strip steel sheet in a longitudinal direction and welding a gap between a pair of butt end surfaces, according to an aspect of the present invention includes: the device for monitoring welding of an electric resistance welded steel pipe according to any one of (12) to (20); and a control device configured to regulate a heat input amount during the welding between a heat input lower limit operation condition in which the cold welding is not reached and a heat input upper limit operation condition in which no welding slit is generated downstream from the V-convergence point.

(22) The device for manufacturing an electric resistance welded steel pipe according to (21), may further include a marking unit configured to, when the determination unit determines that cold welding has occurred, mark a position on the electric resistance welded steel pipe corresponding to the cold welding.

Effects of the Invention

According to the above aspects of the present invention, it is possible to provide a method for monitoring welding of an electric resistance welded steel pipe and a device for monitoring welding of an electric resistance welded steel pipe through which cold welding can be detected in order to appropriately perform a welding operation in a type 1 area where melt-welding is possible. In addition, according to the above aspects of the present invention, it is possible to provide a method for manufacturing an electric resistance welded steel pipe using the method for monitoring welding of an electric resistance welded steel pipe and a device for manufacturing an electric resistance welded steel pipe including the device for monitoring welding of an electric resistance welded steel pipe.

BRIEF DESCRIPTION OF DRAWINGS

FIG. 3(a) shows a state of the type 1 area where melt-welding is possible, and FIG. 3(b) shows a state of cold welding.

FIG. 4(a) shows a state of the type 1 area where melt-welding is possible, and FIG. 4(b) shows a state of cold welding.

FIG. 5(a) shows a state of the type 1 area where melt-welding is possible, and FIG. 5(b) shows a state of cold welding.

FIG. 8(a) shows a state in which a heat input amount is a reference heat input amount, and FIG. 8(b) shows a state in which a heat input amount is a reference heat input amount-8% (cold welding).

FIG. 9(a) shows a state of the type 1 area where melt-welding is possible, and FIG. 9(b) shows a state of cold welding.

FIG. 13(a) shows a state of the type 1 area where melt-welding is possible, and FIG. 13(b) shows a state of cold welding.

FIG. 14(a) shows a state of the type 1 area where melt-welding is possible is shown, and FIG. 14(b) shows a state of cold welding.

FIG. 17(a) shows a state in which a heat input amount is a reference heat input amount, and FIG. 17(b) shows a state in which a heat input amount is a reference heat input amount-8% (cold welding).

EMBODIMENT(S) FOR IMPLEMENTING THE INVENTION

Figure 1:
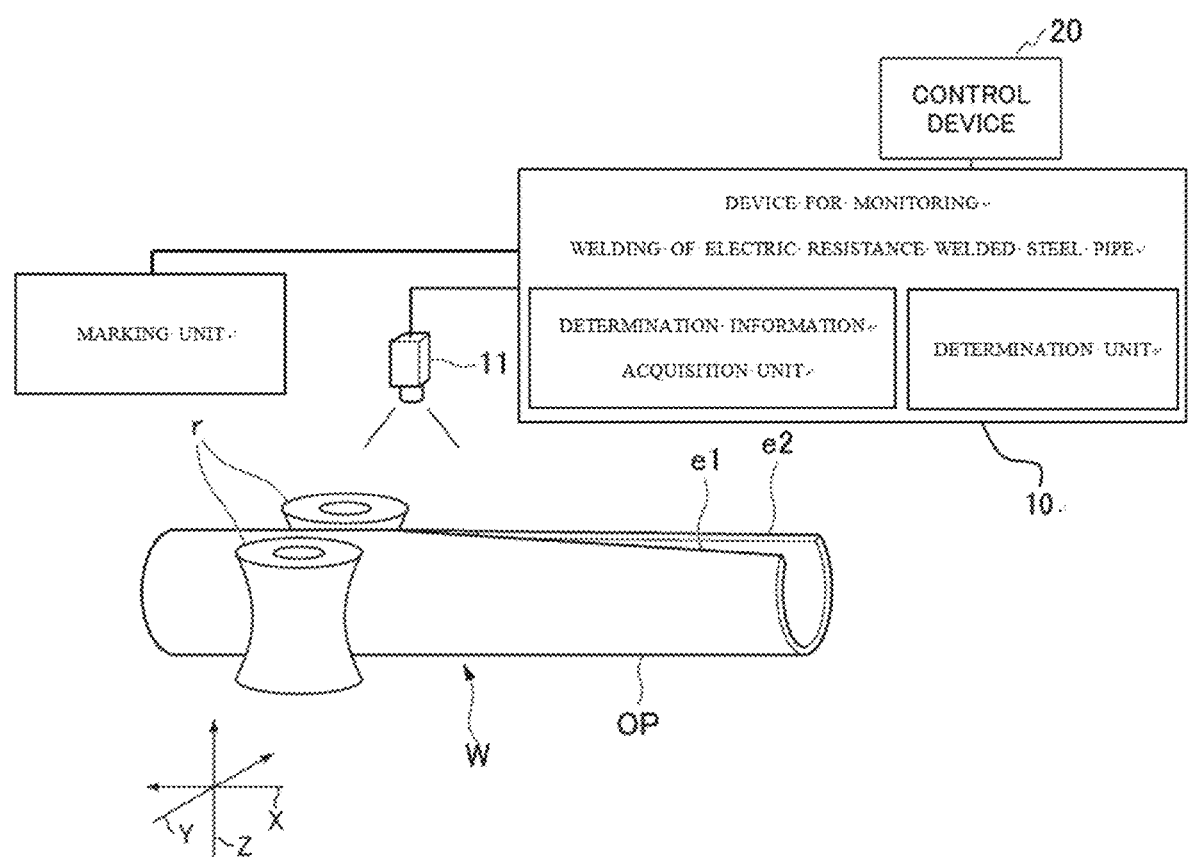
FIG. 1 is a diagram showing a first embodiment of the present invention, and is a perspective view of a device for manufacturing an electric resistance welded steel pipe including a device for monitoring welding of an electric resistance welded steel pipe.

First to third embodiments of the present invention will be described below with reference to the drawings.

First Embodiment

First, the outline of the present embodiment will be described.

In the present embodiment, the relationship between the molten state and the molten steel discharge position is specified by observing a welding portion in detail. That is, more stable detection of a cold welding limit is established by measuring the distance between the V-convergence point and the position where molten steel starts to be discharged, with high accuracy. Here, the heat input amount in the following description is a power (voltage×current) input to the welding portion.

In a method for monitoring welding of an electric resistance welded steel pipe of the present embodiment, in welding of an electric resistance welded steel pipe, a V convergence portion and a V-convergence point of a welding portion, and a welding portion including a position where molten steel starts to be discharged from the inside of the wall thickness and an edge detection area are imaged from thereabove. Then, the captured image of the edge detection area is processed and the distance from the V-convergence point to the position where molten steel starts to be discharged is calculated. In addition, it is determined whether cold welding has occurred by comparing the distance information with a determination threshold value. Therefore, in a process of manufacturing an electric resistance welded steel pipe manufactured by a small-diameter electric resistance welded steel pipe mill for manufacturing a small-diameter steel pipe for automobiles, machines and structures in which the occurrence of a sputter is one cause of defects, it is possible to provide a welding monitoring method which enables detection of cold welding of a type 1 area where melt-welding is possible.

Here, the "type 1 area where melt-welding is possible" is a part of the type 1 area in which no welding slit is generated, and the V-convergence point and the junction point match. The "type 1 area where melt-welding is possible" is a narrow area located between the "type 2 area" on the high heat input side and the "type 1 area with cold welding" on the low heat input side. In the "type 1 area where melt-welding is possible," welding can be performed without causing a sputter and cold welding. The boundary between the "type 1 area where melt-welding is possible" and the "type 2 area" on the high heat input side can be determined by whether a welding slit is generated or by using arcing occurring within the welding slit.

A method for manufacturing an electric resistance welded steel pipe of the present embodiment is a method of manufacturing an electric resistance welded steel pipe by molding a strip steel sheet into an open pipe while sending it in a longitudinal direction and welding a gap between a pair of butt end surfaces, including performing the welding at between heat input lower limit operation conditions in which cold welding is not reached, which are obtained by the method for monitoring welding of an electric resistance welded steel pipe, and heat input upper limit operation conditions in which no welding slit is generated downstream from the V-convergence point.

According to the method for manufacturing an electric resistance welded steel pipe, it is possible to manufacture a small-diameter electric resistance welded steel pipe having a robust welding portion without cold welding or dents.

In addition, a device for monitoring welding of an electric resistance welded steel pipe of the present embodiment includes, in welding of an electric resistance welded steel pipe; a unit configured to image a V-convergence portion including an edge detection area and a V-convergence point, and a welding portion including a molten steel discharge position from the inside of the sheet thickness and a bead from above; a unit configured to process the captured image and measure information on a distance from the V-convergence point to a position where molten steel starts to be discharged; and a unit configured to determine whether cold welding has occurred by comparing the distance information with a determination threshold value. Therefore, in a process of manufacturing an electric resistance welded steel pipe manufactured by a mill for automobiles, machines and structures in which the occurrence of a sputter is one cause of defects, it is possible to provide a welding monitoring device that enables detection of cold welding of a type 1 area where melt-welding is possible in a welding step.

A device for manufacturing an electric resistance welded steel pipe of the present embodiment is a device for manufacturing an electric resistance welded steel pipe by molding a strip steel sheet into an open pipe while sending it in a longitudinal direction and welding a gap between a pair of butt end surfaces and includes: the welding monitoring device; and a control device that regulates a heat input amount during welding between heat input lower limit operation conditions in which cold welding is not reached and heat input upper limit operation conditions in which no welding slit is generated downstream from the V-convergence point.

According to the device for manufacturing an electric resistance welded steel pipe, it is possible to manufacture a small-diameter electric resistance welded steel pipe having a robust welding portion without cold welding or dents.

FIG. 1 shows an example of the device for manufacturing an electric resistance welded steel pipe. Here, in FIG. 1, X represents a transfer direction of a strip steel sheet, Z represents a height direction orthogonal to the transfer direction X, and Y represents a direction (abutting direction) which is orthogonal to both the transfer direction X and the height direction Z and in which butt end surfaces e1 and e2 abut each other.

The device for manufacturing an electric resistance welded steel pipe of the present embodiment includes a roll group (not shown except for an SQ roll r to be described below), a heating unit (not shown), a device for monitoring welding of an electric resistance welded steel pipe 10, and a control device 20.

The roll group includes a plurality of rolls that send a strip steel sheet in the transfer direction X and mold it into a strip-shaped open pipe OP. These rolls include a squeeze roll r (hereinafter referred to as an SQ roll r) that applies an upset force with which the butt end surfaces e1 and e2 are pressed against each other at the welding position.

The heating unit includes a work coil that performs induction heating, and heats a part of the open pipe OP in the longitudinal direction. The open pipe OP that is heated by the heating unit receives the upset force from the SQ roll r, and the butt end surfaces e1 and e2 are pressed against each other and welded.

The device for monitoring welding of an electric resistance welded steel pipe 10 monitors a welding portion W between the pair of butt end surfaces e1 and e2 formed in the open pipe OP while imaging the welding portion W from above with a camera 11. More specifically, by processing the image captured by the camera 11, it is determined whether cold welding has occurred and whether there is a welding slit.

The control device 20 controls the heating unit based on information from the device for monitoring welding of an electric resistance welded steel pipe 10. More specifically, the control device 20 controls a heat input amount, that is, a power (voltage×current) input to the welding portion W based on the information.

Figure 2:
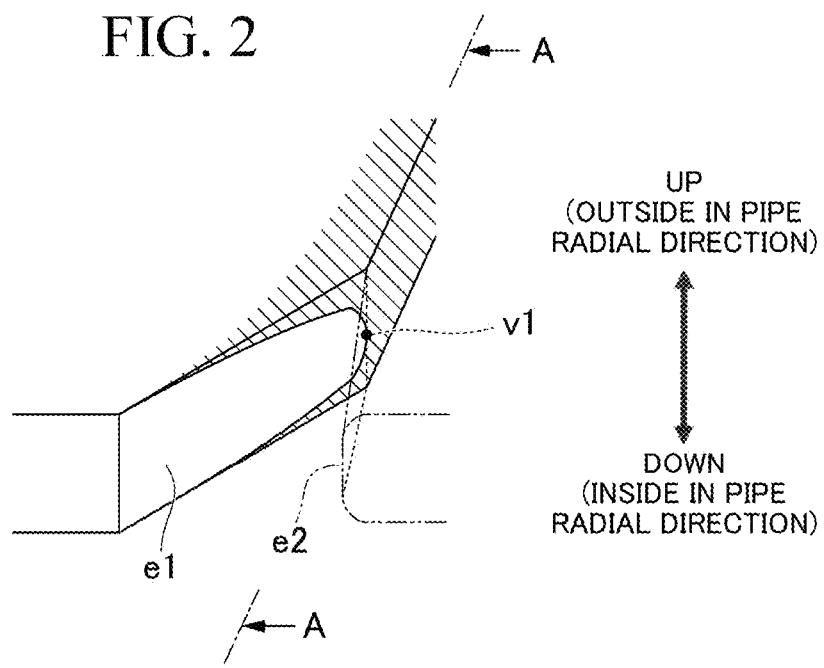
FIG. 2 is a perspective view showing that melting proceeds from a corner of an edge when welding is performed in a type 1 area where melt-welding is possible.

Here, changes in the butt end surfaces e1 and e2 when electric resistance welding is performed will be described. As shown in FIG. 2, in the electric resistance welding step, at each of the butt end surfaces e1 and e2 of the strip steel sheet molded into the open pipe OP, melting starts from both corners in the wall thickness direction (vertical direction). This melting occurs because a high frequency current is concentrated on the corners due to the skin effect. When the distance between the butt end surfaces e1 and e2 becomes short, a high frequency current flows over the entire welded surface due to the proximity effect. As a result, in an ideal state, melting occurs to the center position of the welded surface in the wall thickness direction. Then, the welded surfaces are pressed down with the SQ roll r, and the molten steel is discharged to the outside of the welded surface to form a weld bead.

However, when a heat input amount is insufficient with respect to a pipe production speed, press-down may be performed before the center position in the wall thickness direction melts, and cold welding may occur. Cold welding occurs when the heat input amount is too low in the type 1 area, and refers to a welding state in which, when a cross section of a welding portion perpendicular to the axis of the electric resistance welded steel pipe is viewed, the full thickness of the welding portion in the wall thickness direction has not melted, and a partially unmelted portion remains. The position at which the unmelted portion is formed is not limited to the center position on the welded surface in the wall thickness direction, and the unmelted portion may be formed outside in the pipe radial direction or inside in the pipe radial direction with respect to the center position in the wall thickness direction.

Figure 3:
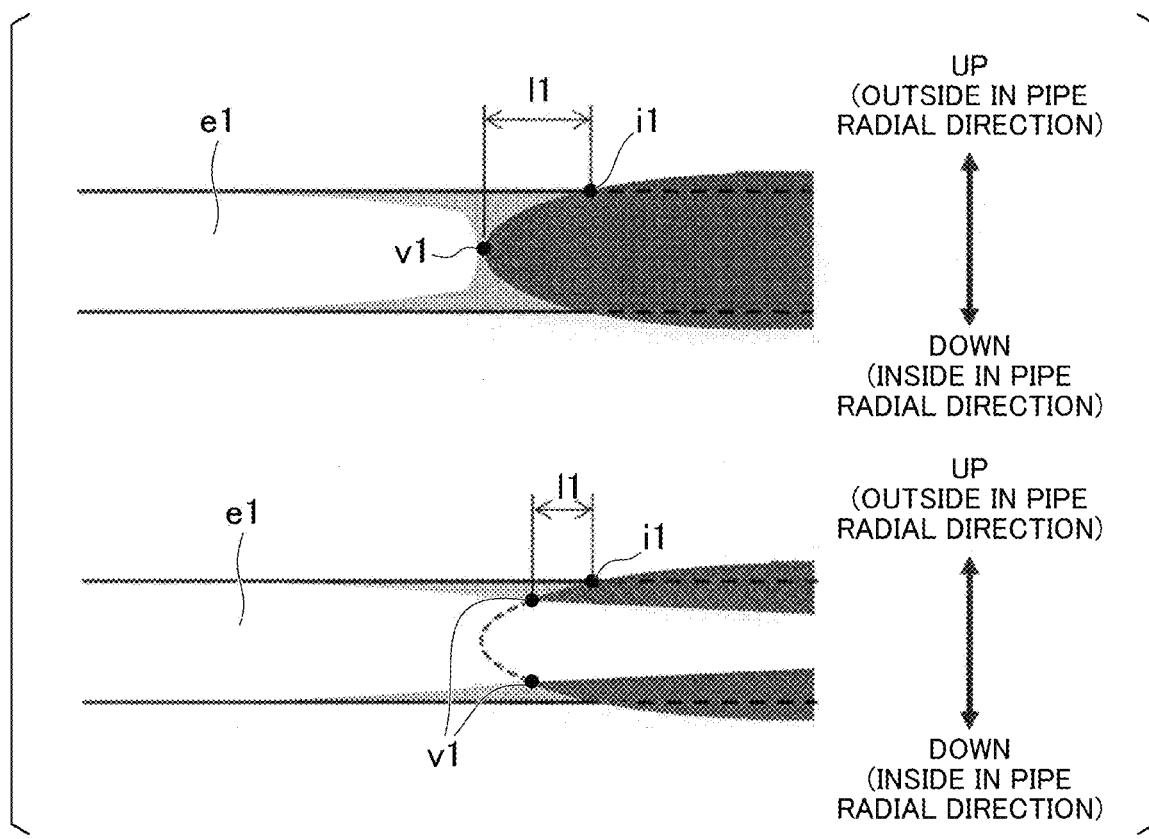
FIG. 3 shows image diagrams showing a distance from a V-convergence point to a position where molten steel starts to be discharged in a view in which the edge is seen from the inside, which shows arrow views taken along the line A-A in FIG. 2.

So far, it has been thought that the position of the V-convergence point is slightly different between cold welding conditions in which such welding defects are caused and the type 1 area where melt-welding is possible to obtain a robust welding portion. However, when the inventors observed the cross section of the welded surface in the longitudinal direction of the electric resistance welded steel pipe, they found that, as shown in FIG. 3, a distance l1 from a V-convergence point v1 to a position where molten steel starts to be discharged i1 (a distance l1 between a V-convergence point v1 and a position where molten steel starts to be discharged i1) differs between the case of the type 1 area where melt-welding is possible and the case of cold welding conditions. That is, it has been found that the distance l1 becomes shorter in the case of cold welding conditions than the case of the type 1 area where melt-welding is possible.

Figure 4:
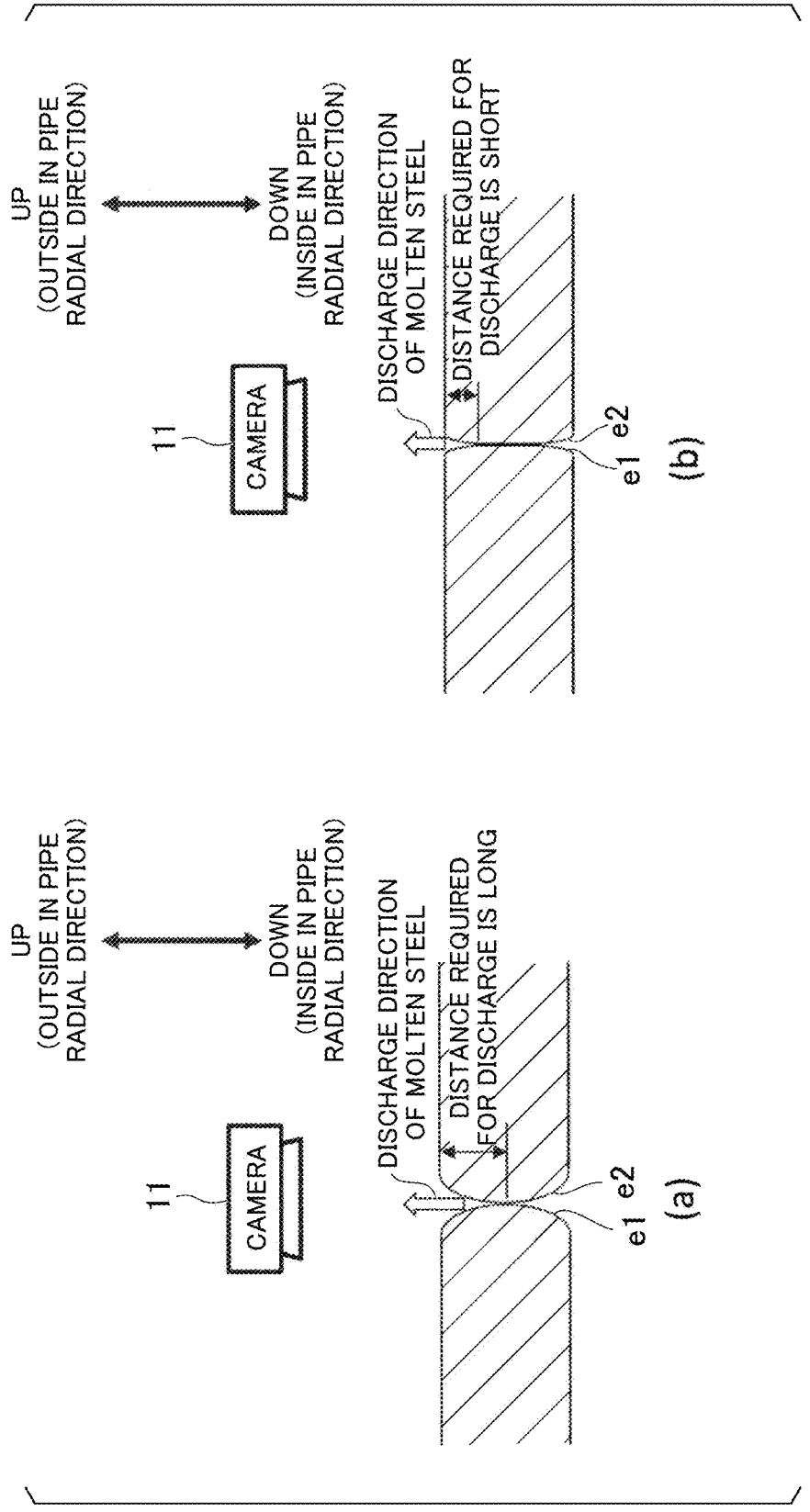
FIG. 4 shows image diagrams of a discharging molten steel in a view in which a welding portion is seen in a cross section perpendicular to the axis of the electric resistance welded steel pipe.

When the cross section (cross section in the circumferential direction) of the welded surface is viewed in the C direction, as shown in FIG. 4(*a*), the welded surfaces (the butt end surfaces e1 and e2) of the open pipe OP are heated and melted from both corners. Then, when the pair of welded surfaces approach each other, the molten area enlarges toward the center of the wall thickness due to the proximity effect.

On the other hand, as shown in FIGS. 4(*a*) and 4(*b*), each welded surface has a shape in which the central part in the wall thickness is overhanging. Thereby, since the central part of the wall thickness melts, as a result of being pressed down with the SQ roll r, the molten steel is discharged from the center of the wall thickness toward the inner and outer surfaces of the open pipe OP. In this case, it has been found that, since the molten steel is discharged only from the inner surface of the steel pipe and the outer surface of the steel pipe, as shown in FIG. 4(*b*), if the melting does not proceed to the center of the wall thickness, the discharge timing of the molten steel becomes earlier than the case in FIG. 4(a).

Figure 5:
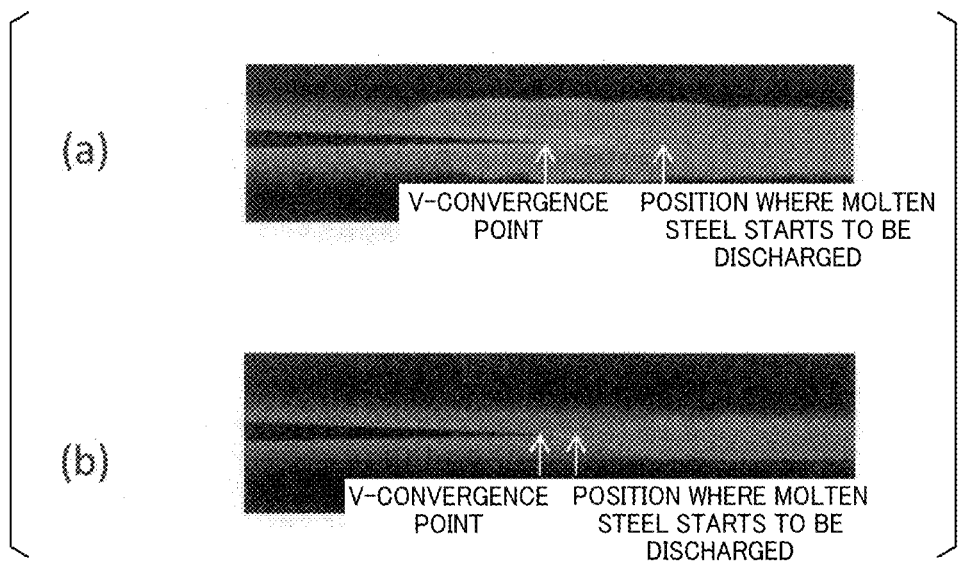
FIG. 5 shows examples of an image of the welding portion imaged from thereabove.

That is, the distance from the molten steel to the inner and outer surfaces of the open pipe OP becomes shorter in the case of cold welding conditions shown in FIG. 4(b) than the case of the type 1 area where melt-welding is possible shown in FIG. 4(a). Therefore, in the case of cold welding conditions, the discharge timing of the molten steel becomes shorter. When this phenomenon is observed from above the welding portion W, as shown in FIGS. 5(a) and 5(b), it has been found that the distance l1 from the V-convergence point v1 to the position where molten steel starts to be discharged i1 is different and the way of gushing out the molten steel inside the wall thickness is different.

Figure 6:
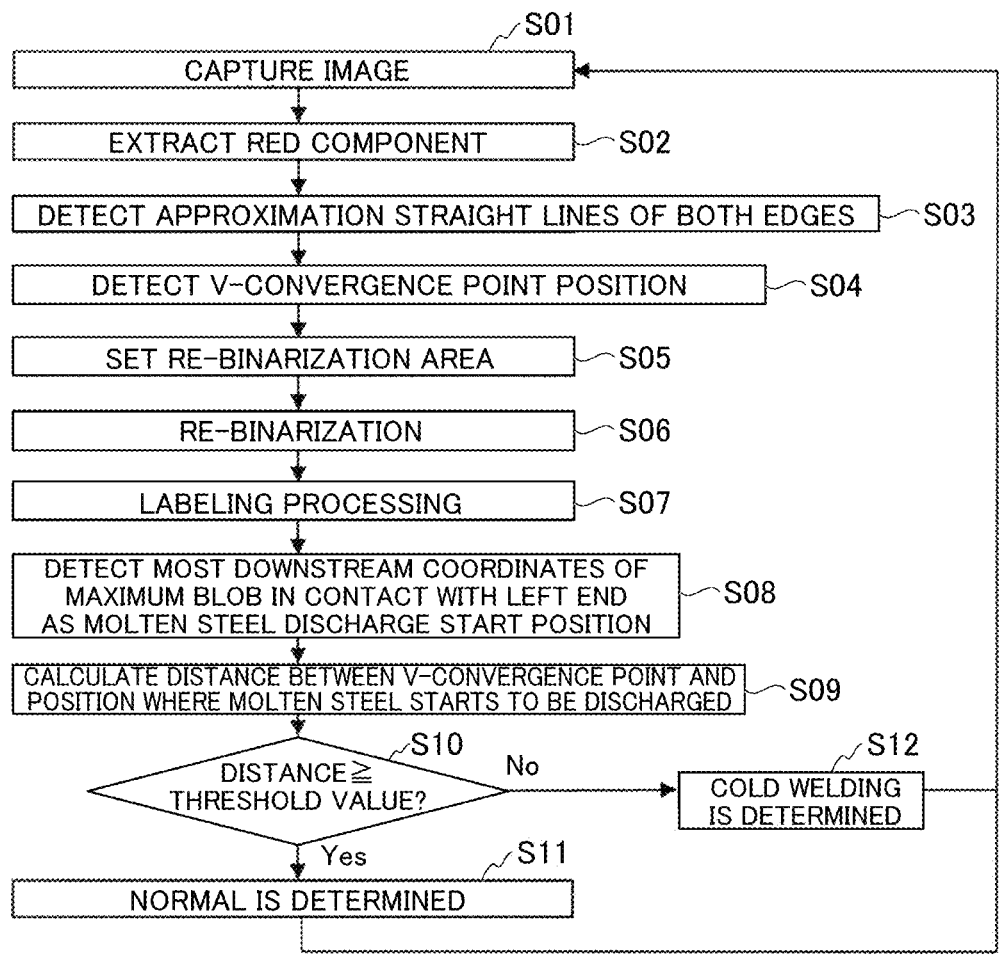
FIG. 6 is a flowchart showing an image processing algorithm according to a first embodiment.
Figure 7:
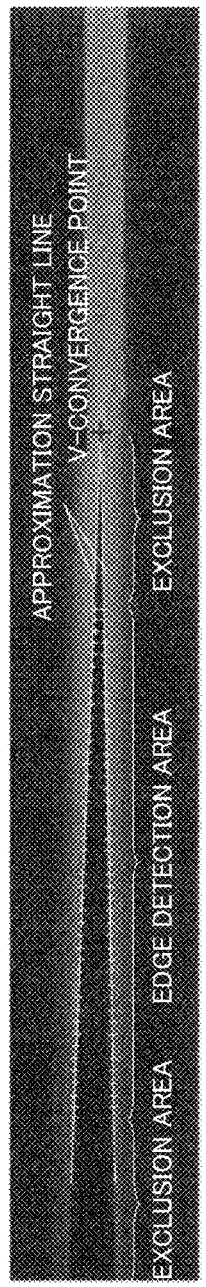
FIG. 7 is an image showing an example of approximation straight lines and a V-convergence point.

Further, based on these findings, the inventors constructed an algorithm for continuously detecting whether cold welding has occurred online and completed it as a system. FIG. 6 shows the algorithm of the present embodiment, for finally calculating "the distance l1 between the V-convergence point v1 and the discharge start position i1." FIG. 7 is an image example in which the V-convergence point v1 is detected from approximate lines of the butt end surfaces (welded surface edges) e1 and e2.

The algorithm in FIG. 6 will be described.

In this process, first, in Step S01, the camera 11 performs imaging and a captured image is obtained.

In the following Step S02, a red component is extracted from the captured image. Here, regarding the extraction component, a green component or a blue component may be used in place of the red component. However, the green component is preferable to the blue component due to high light sensitivity. In addition, the red component is preferable to the green component. Therefore, the red component is most preferable as the extraction component.

In the following Step S03, approximation straight lines of the butt end surfaces (the pair of welded surface edges) e1 and e2 are detected. In this case, an edge detection area is predetermined so that it is not easily affected by the low brightness portion on the upstream side and the vicinity of the V-convergence point v1. In this example, as shown in FIG. 7, 20% of each of the upstream end and the downstream end of the wedge-shaped area surrounded by the butt end surfaces e1 and e2 is excluded, and a pair of approximation straight lines are detected from thereabove.

In the following Step S04, the intersection between the pair of approximate lines obtained in Step S03 is detected as a V-convergence point v1.

In the following Step S05, a re-binarization area is set downstream from the V-convergence point v1. In the example shown in FIGS. 8(a) and 8(b), a rectangular range of 2 mm in the circumferential direction (a vertical direction of the surface of the image) and 10 mm in the longitudinal direction is set as an area in which re-binarization is going to be performed.

Figure 9:
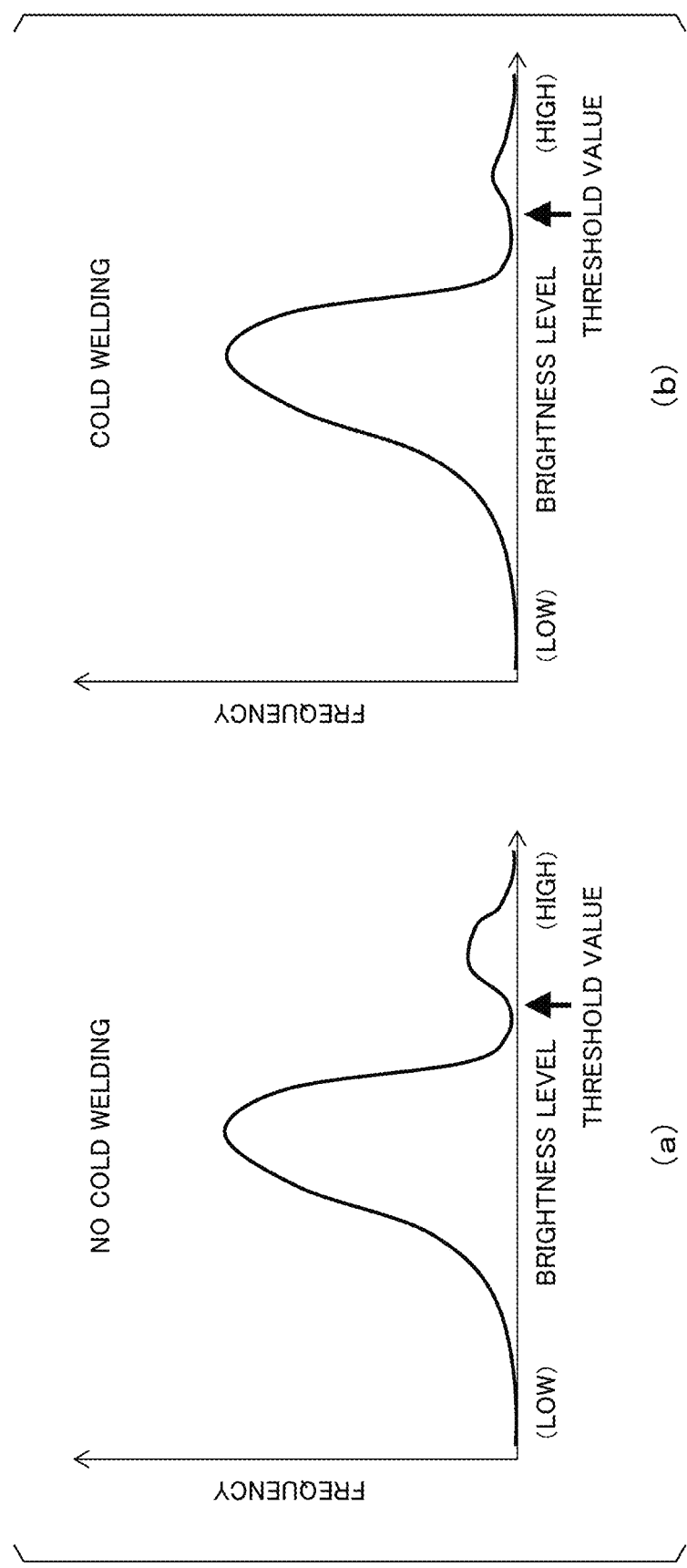
FIG. 9 shows histograms of brightness used to determine a threshold value in a re-binarization process, and the horizontal axis represents brightness level while the vertical axis represents frequency.

In the following Step S06, an area set in Step S05 is re-binarized. The threshold value used when this re-binarization is performed will be described with reference to FIGS. 9(a) and 9(b). In FIGS. 9(a) and 9(b), the horizontal axis represents brightness level in the image, and the vertical axis represents frequency. In FIGS. 9(a) and 9(b), the result of counting the number of pixels in the image for each brightness level to obtain an appearance frequency is obtained as a brightness histogram and then smoothed to eliminate noise. FIG. 9(a) shows a case of appropriate heat input conditions, and FIG. 9(b) shows a case of cold welding conditions.

As can be understood from FIGS. 9(a) and 9(b), the frequency of the brightness level has two peaks regardless of the heat input amount. Between the two peaks, the large peak on the relatively low brightness side indicates light of the molten steel in which the butt end surfaces e1 and e2 are melted. In addition, between the two peaks, the small peak on the relatively high brightness side indicates light of the molten steel discharged toward the outer surface of the open pipe OP. When viewed from the camera 11, there is a difference between the direction of light emitted from the molten steel in the butt end surfaces e1 and e2 and the direction of light emitted from the molten steel on the outer surface of the open pipe OP. Such a difference in the directions of light appears as a difference in emissivity. That is, the difference between the orientation of the butt end surfaces e1 and e2 and the orientation of the outer surface of the open pipe OP when viewed from the camera 11 appears as a difference in emissivity or also as a difference in brightness, which appears in the brightness histogram shown in FIGS. 9(a) and 9(b).

Therefore, the brightness level between the two peaks, more specifically, the brightness level at the rising start position of the small peak on the relatively high brightness level side, can be used as the threshold value. When re-binarization is performed, it is generally thought that the threshold value can be set for the temperature difference, but since the temperature of the molten steel is similar anywhere, it is not suitable for the threshold value in the binarization process. Further, the inventors conducted extensive studies regarding the parameter in the binarization process in place of the temperature, and as a result, found that the brightness is suitable as the parameter in the binarization process for the above reason.

Returning to FIG. 6 again, in Steps S07 and S08, a high brightness area is extracted by labeling the area re-binarized in Step S06. In this case, blobs (white areas in FIGS. 8(a) and 8(b) detected as a mass in labeling processing) in contact with the left end of the re-binarization area are extracted in order to obtain an accurate target area.

In the following Step S09, the distance (maximum length) l1 from the V-convergence point v1 to the position where molten steel starts to be discharged i1 (the most downstream coordinates of the blob) is calculated.

In the following Step S10, it is determined whether normal or cold welding by comparing the distance l1 obtained in Step S09 with a determination threshold value to be described below. That is, when the distance l1 is equal to or larger than a determination threshold value (Yes), the process proceeds to Step S11, and "normal" is determined. On the other hand, when the distance l1 is less than a determination threshold value (No), the process proceeds to Step S12, and "cold welding" is determined.

The control flow after Steps S11 and S12 returns to Step S01, and the above steps are repeated again.

As described above, in the processing of the captured image, it is preferable that: a re-binarization area is set downstream from the V-convergence point v1; a high brightness area is extracted by labeling processing; a distance l1 from the V-convergence point v1 to the position where molten steel starts to be discharged i1 is then calculated; and the distance l1 is compared with a determination threshold value for determination. In addition, in order to enable this step, the captured image processing unit preferably has functions of setting a re-binarization area downstream from the V-convergence point v1, extracting a high brightness area by labeling processing, calculating a distance l1 from the V-convergence point v1 to the position where molten steel starts to be discharged i1, and then comparing the distance l1 with a determination threshold value for determination.

Figure 8:
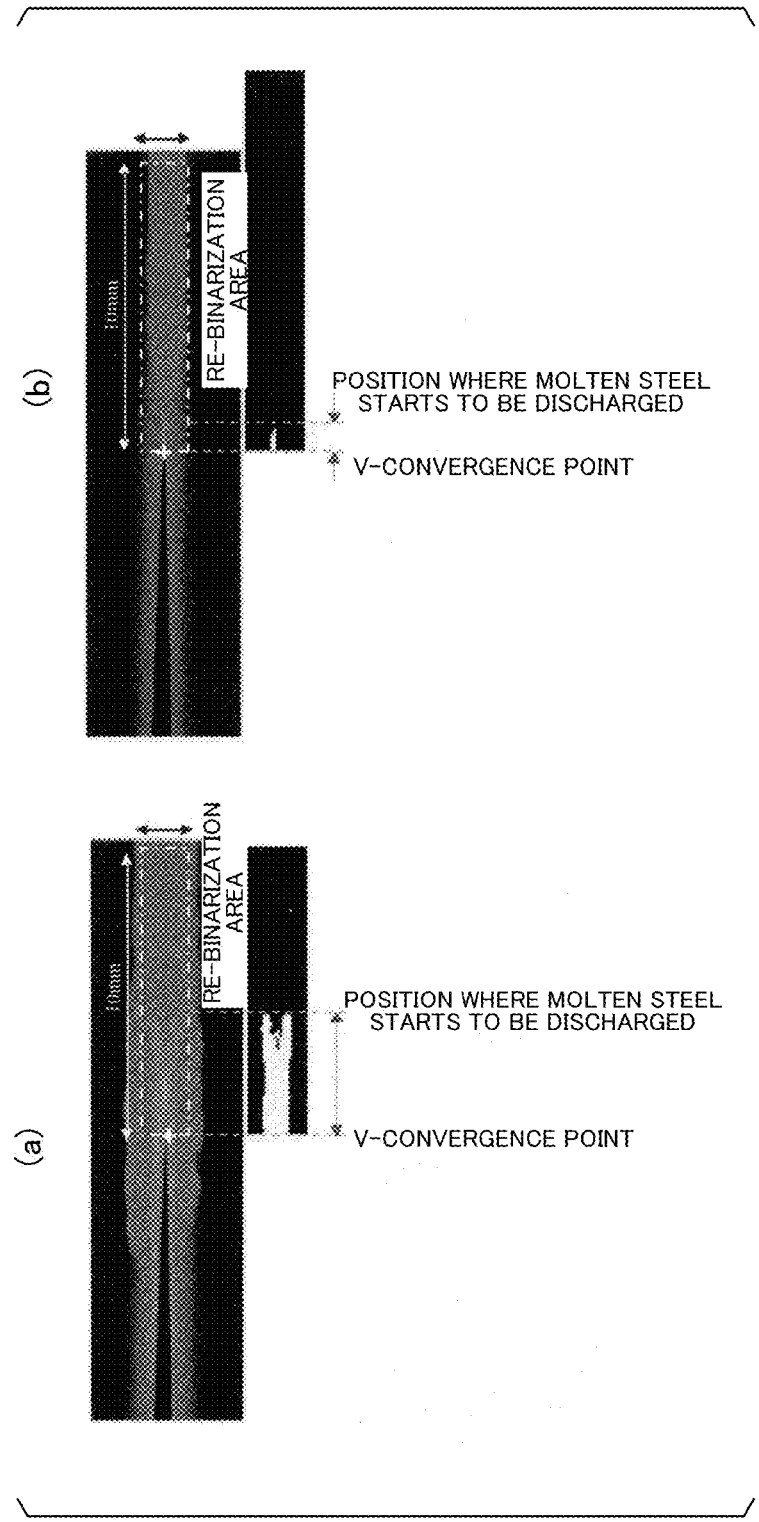
FIG. 8 shows examples of an image showing detection of a distance from the V-convergence point to the position where molten steel starts to be discharged.

FIG. 8(a) shows a processing result example in a normal state (reference heat input), and FIG. 8(b) shows a processing result example in a state of cold welding (reference heat input-8%). Here, the wall thicknesses of the electric resistance welded steel pipes are all within a range of 4.0 mm to 6.0 mm.

Figure 10:
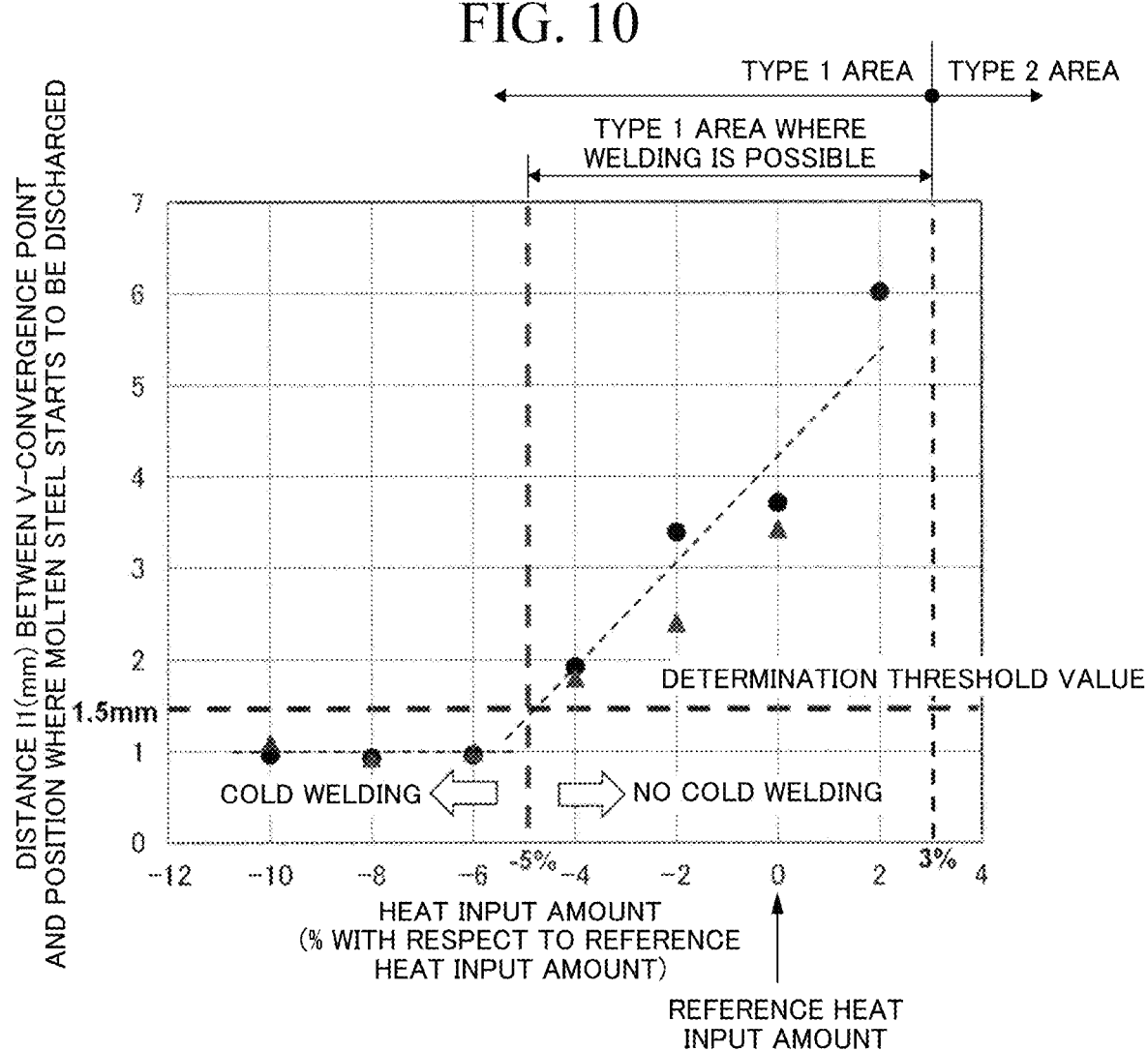
FIG. 10 is a graph showing the relationship between a numerical value (horizontal axis) showing a % increase or decrease of a heat input amount with respect to a reference heat input amount and a distance between the V-convergence point and the molten steel discharge position (a distance (mm) from a V-convergence point to a position where molten steel starts to be discharged) (vertical axis).

It can be understood that the distance between the V-convergence point and the molten steel discharge start point, which is about 4 mm in the processing result example in FIG. 8(a), and is shortened to 1 mm or less in the processing result example in FIG. 8(b). When a graph showing the change in the distance l1 when the heat input amount is changed and the results of polishing and etching the cross section of the electric resistance welded steel pipe perpendicular to the longitudinal direction and observing whether cold welding has occurred under a microscope is created, as shown in FIG. 10, favorable consistency is observed between the two. In FIG. 10, the horizontal axis represents an increase or decrease (%) of a heat input amount with respect to a reference heat input amount, and the vertical axis represents the distance l1 (mm) between the V-convergence point and the molten steel discharge start point. Here, in the plot shown in the same drawing, the welding speed is different between triangle marks and circle marks, but no difference in the tendency is observed between the two.

In FIG. 10, the reference heat input amount on the horizontal axis=0% is set to a value 3% lower than the heat input amount applied to the type 2 area. Using the horizontal axis=-5% as a cold welding limit, division according to whether cold welding has occurred is performed. That is, cold welding occurs in an area in which horizontal axis is less than -5%, and this area becomes a cold welding area. In addition, an area in which the horizontal axis exceeds 3% is a type 2 area in which a welding slit is generated. Therefore, an area in which the horizontal axis is -5% or more and 3% or less is a type 1 area that can be welded. Further, a distance determined at the intersection between the approximate line drawn on the plot in the drawing and the vertical line with a horizontal axis=-5% as a cold welding limit was 1.5 mm Using this distance=1.5 mm as a threshold value for the cold welding limit, it is possible to manufacture an electric resistance welded steel pipe in the type 1 area that can be welded. That is, 1.5 mm can be set as a threshold value in Step S10 in FIG. 6. Here, the threshold value (=1.5 mm) is an example, and increases or decreases depending on the wall thickness of the electric resistance welded steel pipe. The threshold value (=1.5 mm) can be applied within a range in which the wall thickness of the electric resistance welded steel pipe is 4.0 mm to 6.0 mm.

In this manner, determination of whether cold welding has occurred is preferably performed based on whether the distance l1 from the V-convergence point v1 to the position where molten steel starts to be discharged i1 is 1.5 mm or more. In addition, in order to make this possible, the device for monitoring welding of an electric resistance welded steel pipe 10 preferably has a function of determining whether cold welding has occurred based on whether the distance l1 from the V-convergence point v1 to the position where molten steel starts to be discharged i1 is 1.5 mm or more.

Figure 11:
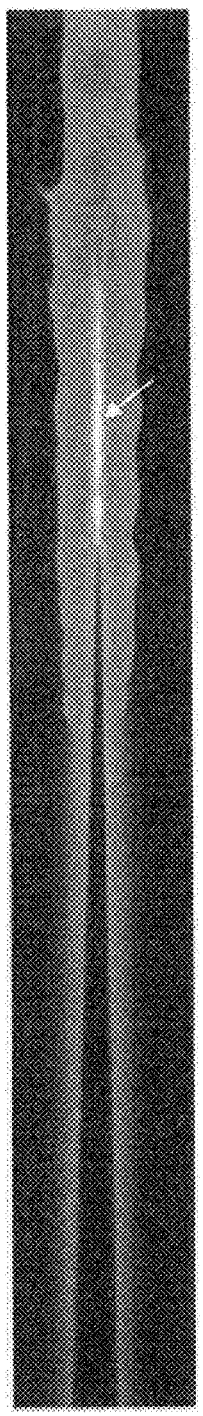
FIG. 11 is an example of an image of a welding portion imaged from thereabove when heat is input to a type 2 area. In the drawing, an arc is generated in a part indicated by a white arrow.

According to the above content, it is possible to detect the lower limit (cold welding limit) of the type 1 area where melt-welding is possible. On the other hand, it has been found that the upper limit of the heat input amount corresponds to the lower limit of the type 2 area, and the frequency of arcs generated in the grown welding slit increases (FIG. 11). Therefore, the "upper limit of the type 1 area where melt-welding is possible" can be detected by a technology known as a "method of measuring a frequency of arcs in the welding slit."

The device for monitoring welding of an electric resistance welded steel pipe 10 which has obtained information on the range of the type 1 area where melt-welding is possible in this manner transmits the same information to the control device 20. The control device 20 controls the heat input amount for welding the open pipe OP, that is, a power (voltage×current) input to the welding portion W, based on the information received from the device for monitoring welding of an electric resistance welded steel pipe 10. Specifically, a power (voltage×current) input to the welding portion W is controlled so that it falls between the lower limit (cold welding limit) of the type 1 area where melt-welding is possible and a value 3% lower than the lower limit heat input amount (lower limit input power) of the type 2 area.

Here, in the device for manufacturing an electric resistance welded steel pipe of the present embodiment, the pipe transmission length may be measured by employing a pipe transmission distance meter (not shown) to a pipe production line. In this case, by storing a determination threshold value for each product type in the control device 20 (a host computer such as a process computer) so that a pipe transmission length can be tracked based on the image, it is possible to determine cold welding that causes welding defects and also specify a position at which cold welding occurs. Therefore, it is possible to manage the cold welding position and instruct the operator to exclude the defective parts. Alternatively, it is possible to mark defective parts downstream from the welding portion by spraying or the like.

In this manner, it is preferable to compare the distance l1 from the V-convergence point v1 to the position where molten steel starts to be discharged i1 with the determination threshold value for each product type stored in the control device 20 (host computer) for determination. In addition, in order to make this possible, the device for monitoring welding of an electric resistance welded steel pipe 10 preferably has a function of comparing the distance l1 from the V-convergence point v1 to the position where molten steel starts to be discharged i1 with the determination threshold value for each product type stored in the control device 20 for determination.

In addition, based on the determination results, for the electric resistance welded steel pipe determined to have welding defects, it is preferable to mark the defective welding part of the electric resistance welded steel pipe at a position downstream from the welding portion. In order to make this possible, it is preferable for the device for manufacturing an electric resistance welded steel pipe to have a function of marking the defective welding part at a position downstream from the welding portion for the electric resistance welded steel pipe determined to have welding defects based on the determination results. Here, for the distance l1 from the V-convergence point v1 to the position where molten steel starts to be discharged i1, it is preferable to continuously measure the full length excluding the middle joint point and the like for quality assurance.

EXAMPLES

In the actual manufacturing line, the welding portion W including a position where molten steel starts to be discharged from the inside of the wall thickness and an edge detection area was imaged at an imaging resolution of 25 μm (a camera with 2K pixels in the longitudinal direction and a field of view of 50 mm), and the welding state was monitored while imaging the full length of the welding portion at intervals of 25 milliseconds and performing image processing. The target pipe was a φ100 mm×5 mmt real pipe, and the camera used for imaging was set to 40 frames/sec, and the exposure time was 1/10,000 seconds. The heat input was intentionally changed, and the result of tracking, cross section inspection, and confirming the presence or absence of a bond was compared with the part in which cold welding was determined.

Figure 12:
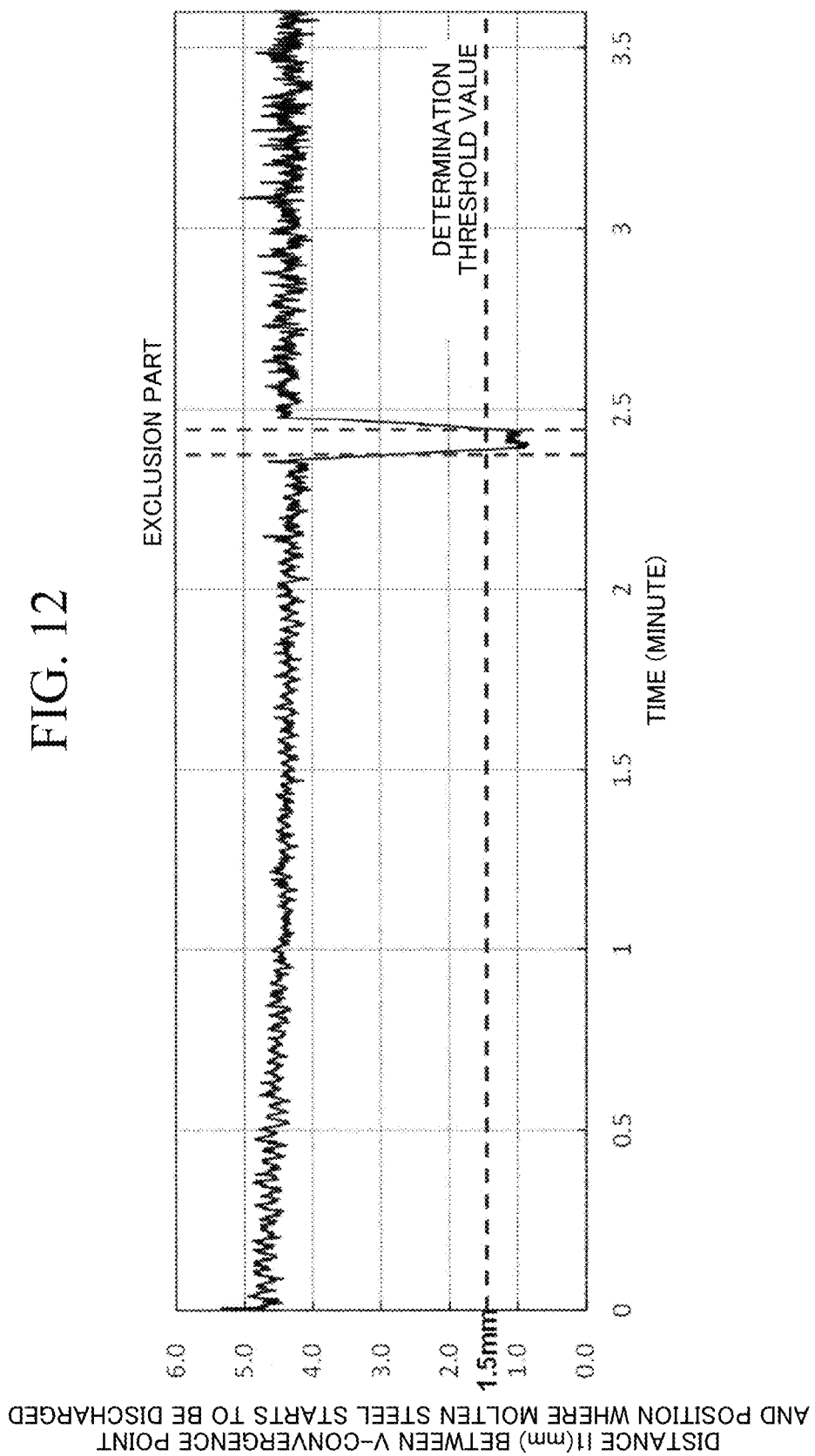
FIG. 12 is a graph showing an example of the change in the distance between the V-convergence point and the molten steel discharge position (distance from the V-convergence point to the position where molten steel starts to be discharged) over time.

FIG. 12 is an example of data collected by applying this method online. Around 2.4 minutes from the start, the distance l1 between the V-convergence point and the molten steel discharge position was 1.5 mm or less, and it was determined that cold welding had occurred. The image processing device had a function of capturing a signal of a PLG attached to the line and measuring the length from the middle joint point and the image and the actual length were tracked. The position at which it was determined that cold welding had occurred was transmitted to the process computer and the process computer could specify the exclusion part for the operator. Alternatively, it was also possible to mark the defective part downstream from the welding by spraying or the like. In this example, when the part in which it was confirmed that the distance l1 between the V-convergence point and the molten steel discharge position was 1.5 mm or less was subjected to a flattening test after exclusion, it was cracked, and thus it was confirmed that cold welding had occurred.

According to the present embodiment described above, since it is possible to automatically detect the part in which cold welding has occurred and it is possible to remove defective parts, it is possible to confirm the robustness of the welding portion of the product.

Second Embodiment

First, the outline of the present embodiment will be described.

In the present embodiment, more stable detection of a cold welding limit was established by clarifying the relationship between the molten width at the corner of the welded surface and the molten state to measure the molten width with high accuracy.

Hereinafter, forms for implementing the present invention will be described. Here, since the configuration of the device for manufacturing an electric resistance welded steel pipe is the same as that of the first embodiment, the same reference numerals are used for respective components and the differences will be mainly described.

In the method for monitoring welding of an electric resistance welded steel pipe of the present embodiment, in electric resistance welded steel pipe welding, a V-convergence portion including an edge detection area and the V-convergence point v1, and the welding portion W including a position where molten steel starts to be discharged from the inside of the wall thickness and a bead are imaged from above the welding portion. Further, the captured image of the edge detection area is processed and a molten width w1 is calculated. In addition, it is determined whether cold welding has occurred by comparing the molten width w1 with the determination threshold value set based on data for each wall thickness in advance. Therefore, as described above, in a process of manufacturing an electric resistance welded steel pipe manufactured by a small-diameter electric resistance welded steel pipe mill for manufacturing a small-diameter steel pipe for automobiles, machines and structures in which the occurrence of a sputter is one cause of defects, it is possible to provide a welding monitoring method in which cold welding of the type 1 area where melt-welding is possible is detected.

In addition, the device for monitoring welding of an electric resistance welded steel pipe includes: in welding of an electric resistance welded steel pipe, a unit configured to image a V-convergence portion including an edge detection area and a V-convergence point v1, and a welding portion W including a position where molten steel starts to be discharged from the inside of the wall thickness and a bead, from above; a unit configured to process a captured image and measure a molten width w1; and a unit configured to determine whether cold welding has occurred by comparing information on the molten width with a determination threshold value set based on data for each wall thickness in advance. Therefore, in a process of manufacturing an electric resistance welded steel pipe manufactured by a mill for automobiles, machines and structures in which the occurrence of a sputter is one cause of defects, it is possible to detect cold welding in a type 1 area where melt-welding is possible.

Figure 13:
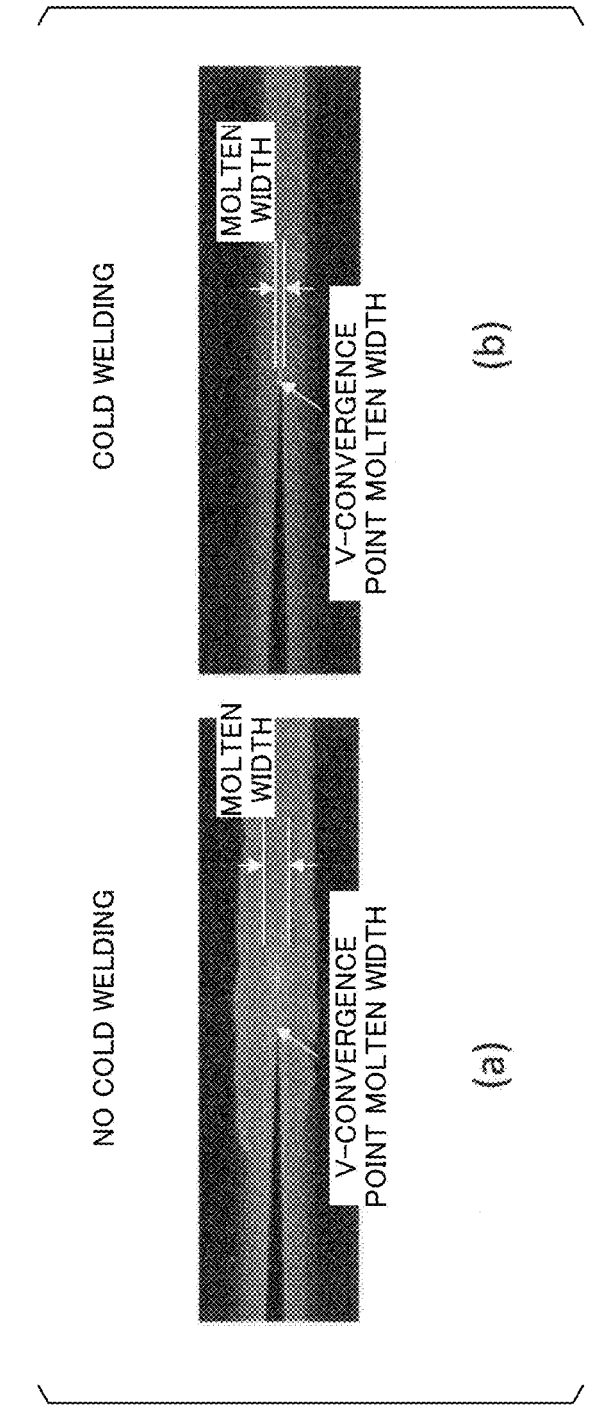
FIG. 13 shows diagrams of a second embodiment of the present invention and examples of an image of a welding portion imaged from thereabove.

As a result of detailed examination of the image of the welding portion W imaged from above, as shown in FIG. 13, the inventors found that the molten width w1 differs between the normal state and the cold welding state.

As shown in FIG. 2 in the first embodiment, the butt end surfaces e1 and e2 of the open pipe OP are heated and melted from both corners in the wall thickness direction. Then, when the distance between the butt end surfaces e1 and e2 becomes short, the molten area enlarges toward the center of the wall thickness due to the proximity effect. Accordingly, both corners of the butt end surfaces e1 and e2 in the wall thickness direction are also melted, and thus the molten width differs depending on the heat input amount. In particular, it is inferred that, since melting does not proceed to the center of the wall thickness during cold welding, as shown in FIG. 13(b), the molten width between the corners becomes significantly narrow. In FIG. 13(b) in which this phenomenon is imaged from above with the camera 11, it has been found that the brightness of the area showing the molten width w1 is high.

Figure 14:
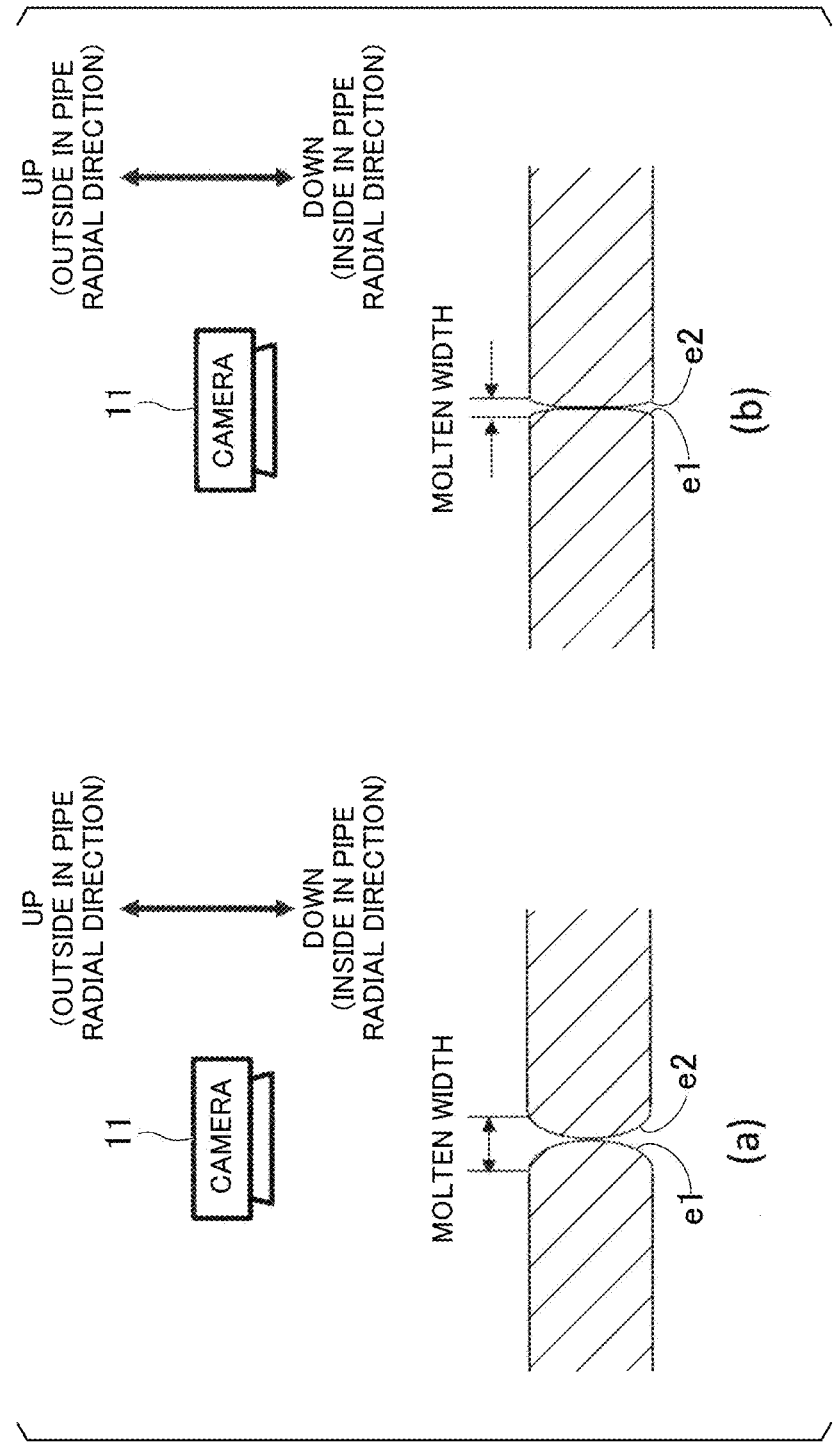
FIG. 14 shows image diagrams of a molten width in a view seen in a vertical cross section of a welding portion perpendicular to the axis of the electric resistance welded steel pipe.
Figure 15:
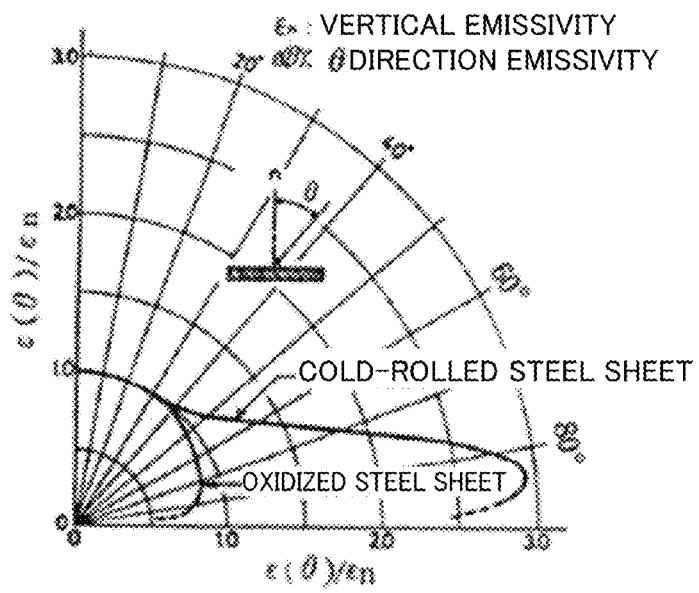
FIG. 15 is a diagram showing an example of angle dependence of emissivity.

In order to infer this phenomenon, the inventors examined whether angle dependence that changes depending on the direction of radiation brightness can be utilized. FIG. 15 shows an example of angle dependence although it is of a cold-rolled steel sheet. In this example, the brightness tends to be higher as the angle θ from the normal line of the sheet surface is larger, that is, as an angle from the sheet surface is shallower. Assuming that the molten steel also has the same tendency, it is thought that the brightness from a part (edge corner, near the welded surface) at a shallow angle increases when the cross section shown in FIGS. 14(a) and 14(b) is observed from a position of the camera 11 above. Focusing on this point, as shown in FIGS. 13(a) and 13(b), a method in which a maximum width size of the high brightness area downstream from the V-convergence point v1 is set as a molten width w1, and the molten width w1 is measured to determine a cold welding limit is constructed.

Figure 16:
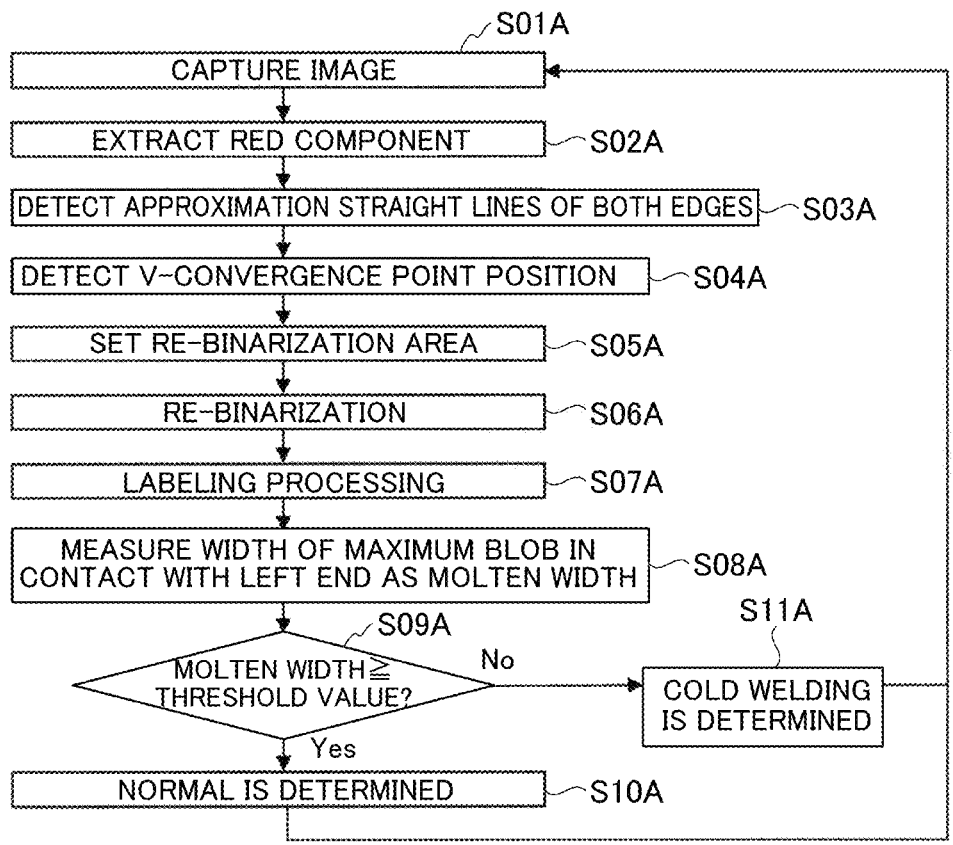
FIG. 16 is a flowchart showing an image processing algorithm according to the second embodiment.
Figure 17:
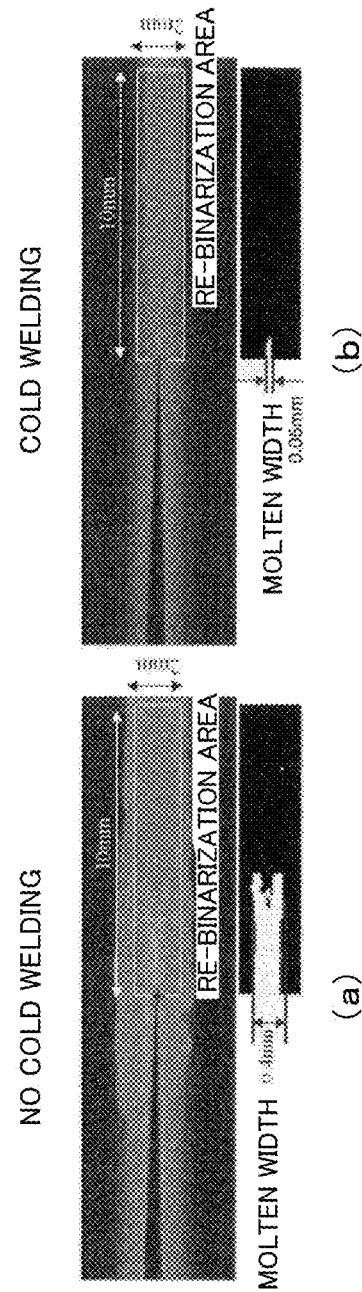
FIG. 17 shows graphs of an example of detecting a molten width.

In addition, an algorithm for continuously detecting a molten width online is constructed, and completed it as a system. FIG. 16 shows an algorithm processing example of the present embodiment, and finally, the "molten width" is measured. FIGS. 17(a) and 17(b) show an example of an image in which a V-convergence point v1 is detected from approximate lines of a pair of butt end surfaces e1 and e2.

The algorithm in FIG. 16 will be described.

In this process, first, in Step S01A, the camera 11 performs imaging and a captured image is obtained.

In the following Step S02A, a red component is extracted from the captured image. Here, regarding the extraction component, a green component or a blue component may be used in place of the red component. However, the green component is preferable to the blue component due to high light sensitivity. In addition, the red component is preferable to the green component. Therefore, the red component is most preferable as the extraction component.

In the following Step S03A, approximation straight lines of the butt end surfaces (the pair of welded surface edges) e1 and e2 are detected. In this case, an edge detection area is predetermined so that it is not easily affected by the low brightness portion on the upstream side and the vicinity of the V-convergence point. In this example, as shown in FIG. 7 in the first embodiment, 20% of each of the upstream end and the downstream end of the wedge-shaped area surrounded by the butt end surfaces e1 and e2 is excluded, and thereafter a pair of approximation straight lines are detected.

In the following Step S04, the intersection between the pair of approximate lines obtained in Step S03 is detected as a V-convergence point v1.

In the following Step S0SA, a re-binarization area is set downstream from the V-convergence point v1. In the example shown in FIGS. 17(a) and 17(b), a rectangular range of 2 mm in the circumferential direction (a vertical direction of the image on the sheet) and 10 mm in the longitudinal direction is set as an area in which re-binarization is going to be performed.

In the following Step S06A, an area set in Step S0SA is re-binarized. Since setting of the threshold value when the re-binarization is performed and the like have already been described in the first embodiment, descriptions thereof will be omitted here.

In Steps S07A and S08A, a high brightness area is extracted by labeling the area re-binarized in Step S06A. In this case, blobs (white areas in FIGS. 17(a) and 17(b) detected as a mass in labeling processing) in contact with the left end of the re-binarization area are extracted in order to obtain an accurate target area. Then, the molten width of the high brightness area is measured.

In the following Step S09A, it is determined whether cold welding or normal welding by comparing the molten width obtained in Step S08A with a determination threshold value which is to be described below. That is, when the molten width is equal to or larger than a determination threshold value (Yes), the process proceeds to Step S10A and "normal" is determined. On the other hand, when the distance is less than the determination threshold value (No), the process proceeds to Step S11A, and "cold welding" is determined.

The control flow after Steps S10A and 11A returns to Step S01A, and the above respective steps are repeated again.

FIG. 17(a) shows a processing result example in a normal state (reference heat input), and FIG. 17(b) shows a processing result example in a state of cold welding (reference heat input—8%). Here, the wall thicknesses of the electric resistance welded steel pipes are all within a range of 4.0 mm to 6.0 mm.

Figure 18:
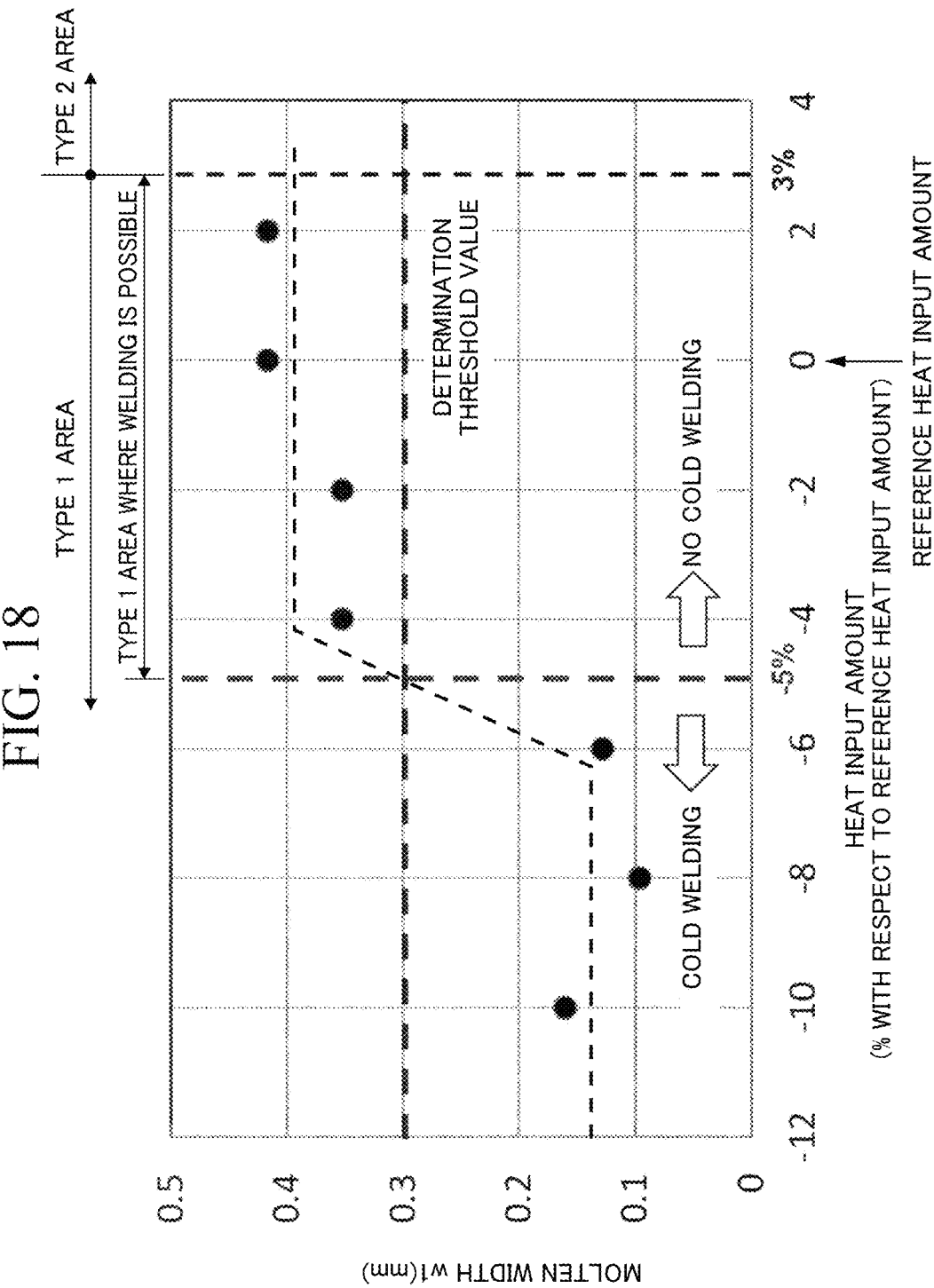
FIG. 18 is a graph showing the relationship between a numerical value (horizontal axis) showing a % increase or decrease of a heat input amount with respect to a reference heat input amount and a molten width (mm) (vertical axis).

It can be understood that the molten width is about 0.4 mm in the processing result example in FIG. 17(a), while the molten width is narrowed to 0.06 mm in the processing result example in FIG. 17(b). When a graph showing the change in the molten width w1 when the heat input amount is changed, and the results of polishing and etching the cross section of the electric resistance welded steel pipe perpendicular to the longitudinal direction and observing whether cold welding has occurred under a microscope is created, as shown in FIG. 18, favorable consistency is observed between the two. In FIG. 18, the horizontal axis represents an increase or decrease (%) of a heat input amount with respect to a reference heat input amount, and the vertical axis represents the molten width w1 (mm).

In FIG. 18, the reference heat input amount on the horizontal axis=0% is set to a value 3% lower than the heat input amount applied to the type 2 area.

In the results in FIG. 18, when the horizontal axis is −4% or more, no cold welding occurs, and when the horizontal axis is −6% or less, cold welding occurs. In this manner, using the horizontal axis=−5% as a cold welding limit, division according to whether cold welding has occurred is performed. That is, cold welding occurs in an area in which the horizontal axis is less than −5%, and this area becomes a cold welding area. In addition, an area in which the horizontal axis exceeds 3% is a type 2 area in which a welding slit is generated. Therefore, an area in which the horizontal axis is −5% or more and 3% or less is a type 1 area that enables welding. Further, a molten width w1 determined at the intersection between the approximate line drawn on the plot in the drawing and the vertical line with a horizontal axis=−5% as a cold welding limit was 0.3 mm. Using the molten width w1=0.3 mm as a threshold value for the cold welding limit, it is possible to manufacture an electric resistance welded steel pipe in the type 1 area that enables welding. That is, in Step S09A in FIG. 16, 0.3 mm can be set as the threshold value.

Here, although the upper limit of the molten width w1 is not particularly limited, when the heat input amount increases, it is entered to the type 2 area before the molten width w1 becomes wider. Therefore, in principle, since it does not exceed the bead width (which is about 3 mm in the example shown in FIG. 17(a)), the upper limit value of the molten width w1 may be set to 3 mm. Here, the above numerical value are for the case where the wall thickness of the electric resistance welded steel pipe is 4.0 mm to 6.0 mm.

In this manner, in determination of whether cold welding has occurred, first, a re-binarization area is set downstream from the V-convergence point v1, a high brightness area is extracted by labeling processing, and a molten width w1 is then calculated. Then, it is preferable to make determination by comparing the molten width w1 with the determination threshold value which was set in advance based on data for each wall thickness. That is, when the wall thickness of the electric resistance welded steel pipe is 4.0 mm to 6.0 mm, it is preferable to perform determination based on whether the molten width w1 is 0.3 mm or more.

In addition, in order to make this possible, the captured image processing unit preferably has functions of setting a re-binarization area downstream from the V-convergence point v1, extracting a high brightness area by labeling processing, then calculating a molten width w1, and making determination by comparing the molten width w1 with a determination threshold value which was set in advance based on data for each wall thickness. That is, when the wall thickness of the electric resistance welded steel pipe is 4.0 mm to 6.0 mm, it is preferable to have a function of determining based on whether the molten width w1 is 0.3 mm or more.

According to the above content, it is possible to detect the lower limit (cold welding limit) of the type 1 area where melt-welding is possible. On the other hand, it has been found that the upper limit of the heat input amount corresponds to the lower limit of the type 2 area, and the frequency of arcs generated between grown welding slits increases (refer to FIG. 11 in the first embodiment). Therefore, the "upper limit of the type 1 area where melt-welding is possible" can be detected by a technology known as a "method of measuring a frequency of arcs between welding slits."

The device for monitoring welding of an electric resistance welded steel pipe 10 which has obtained information on the range of the type 1 area where melt-welding is possible in this manner transmits the same information to the control device 20. The control device 20 controls the heat input amount when the open pipe OP is welded, that is, a power (voltage×current) input to the welding portion W, based on the information received from the device for monitoring welding of an electric resistance welded steel pipe 10. Specifically, a power (voltage×current) input to the welding portion W is controlled so that it falls between the lower limit (cold welding limit) of the type 1 area where melt-welding is possible and a value 3% lower than the lower limit heat input amount (lower limit input power) of the type 2 area.

Here, in the device for manufacturing an electric resistance welded steel pipe of the present embodiment, the pipe transmission length may be measured by attaching a pipe transmission distance meter (not shown) to a pipe production line. In this case, when the control device 20 (a host computer such as a process computer) stores a determination threshold value for each product type so that a pipe transmission length can be tracked based on the image, it is possible to determine cold welding that causes welding defects and also specify a position at which cold welding occurs. Therefore, it is possible to manage the cold welding position and instruct the operator to exclude the parts. Alternatively, it is possible to mark actual objects downstream from the welding by spraying or the like.

In this manner, it is preferable to compare the molten width w1 with the determination threshold value for each product type stored in the control device 20 (host computer) for determination. In addition, in order to make this possible, the device for monitoring welding of an electric resistance welded steel pipe 10 preferably has a function of comparing the molten width w1 with the determination threshold value for each product type stored in the control device 20 for determination.

In addition, based on the determination results, for the electric resistance welded steel pipe determined to have welding defects, it is preferable to mark the defective welding part of the electric resistance welded steel pipe at a position downstream from the welding portion W. In order to make this possible, it is preferable for the device for manufacturing an electric resistance welded steel pipe to have a function of marking the defective welding part at a position downstream from the welding portion for the electric resistance welded steel pipe determined to have welding defects based on the determination results. Here, in measurement of the molten width w1, it is preferable to continuously measure the full length excluding the middle joint point and the like for quality assurance.

EXAMPLES

In the actual manufacturing line, the welding portion W including a molten steel discharge position from the inside of the wall thickness and an edge detection area was imaged at an imaging resolution of 25 μm (a camera with 2K pixels in the longitudinal direction and a field of view of 50 mm), and the welding state was monitored while continuously imaging at intervals of 25 milliseconds and performing image processing. The target pipe was a φ100 mm×5 mmt real pipe, and the camera used for imaging was set to 40 frames/sec, and the exposure time was 1/10,000 seconds. The heat input was intentionally changed while tracking; and the result of confirming the presence or absence of a bond in a cross section inspection was compared with the part in which cold welding was determined.

Figure 19:
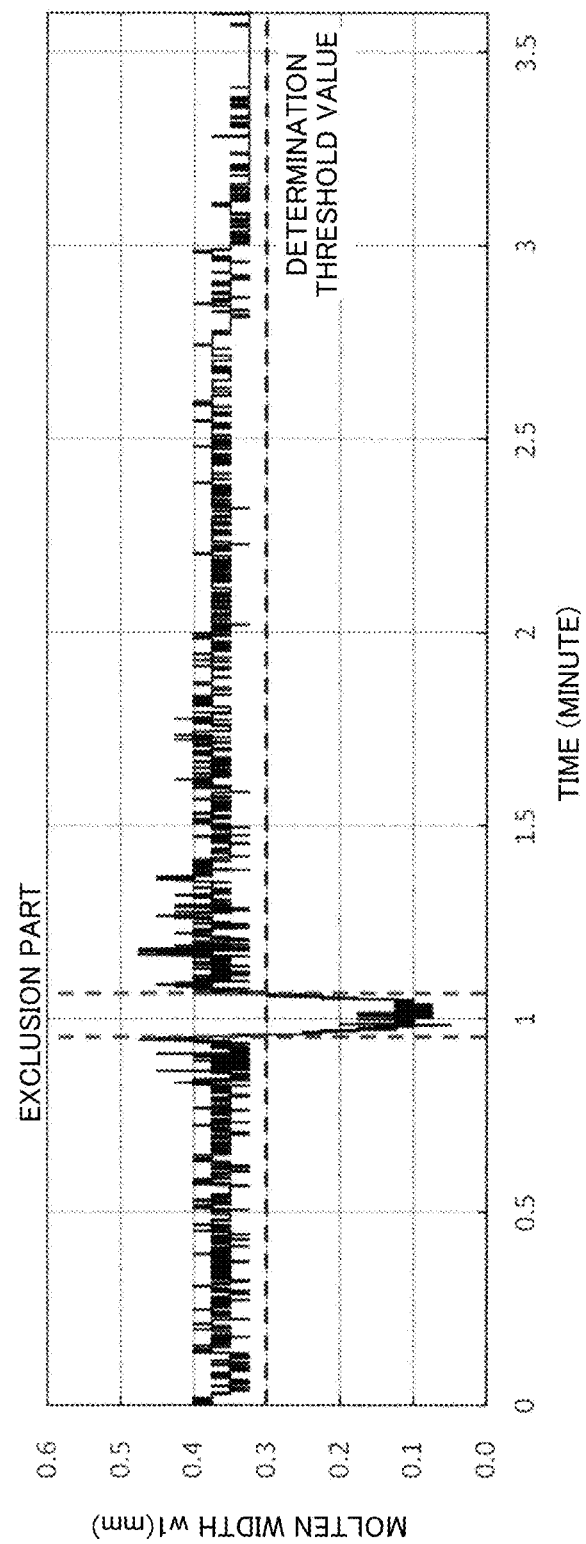
FIG. 19 is a graph showing the change in the molten width over time.

FIG. 19 is an example of data collected by applying this method to online. Around 1 minute from the start, the molten width w1 was 0.3 mm or less, and it was determined that cold welding had occurred. The image processing device had a function of capturing a signal of a PLG attached to the line, and measuring the length from the middle joint point; and the image and the actual length were tracked. The position at which it was determined that cold welding had occurred was transmitted to the process computer and the process computer could specify the exclusion part for the operator. Alternatively, it was also possible to mark the actual object downstream from the welding portion W by spraying or the like. In this example, when the part in which the molten width w1 was 0.3 mm or less was subjected to a flattening test after exclusion, it was cracked and thus it was confirmed that cold welding had occurred.

According to the present embodiment described above, since it is possible to automatically detect the part in which cold welding has occurred and it is possible to remove defective parts, it is possible to confirm the robustness of the welding portion of the product.

Third Embodiment

Figure 20:
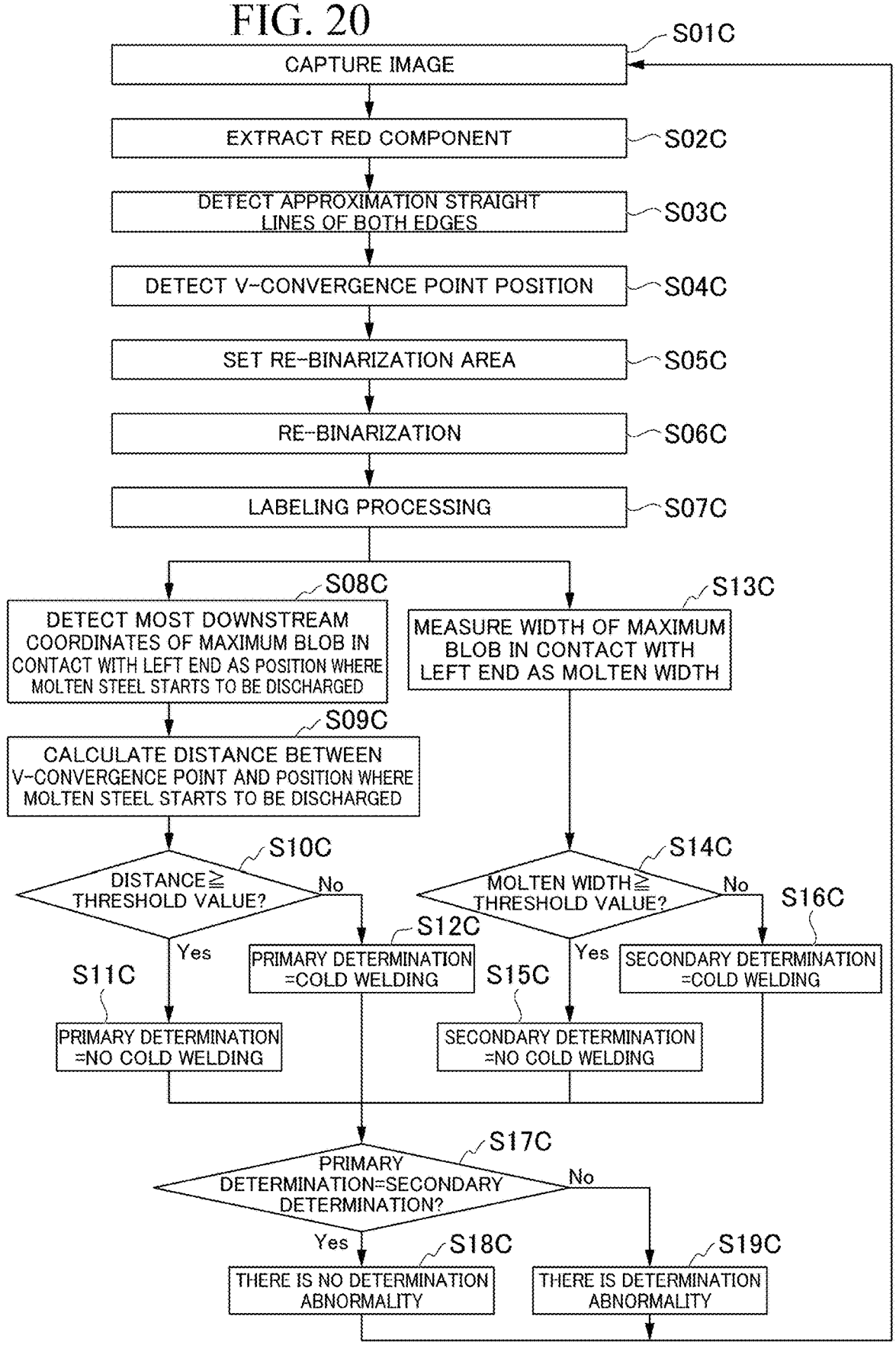
FIG. 20 is a diagram showing a third embodiment of the present invention and is a flowchart showing an image processing algorithm.
Figure 21:
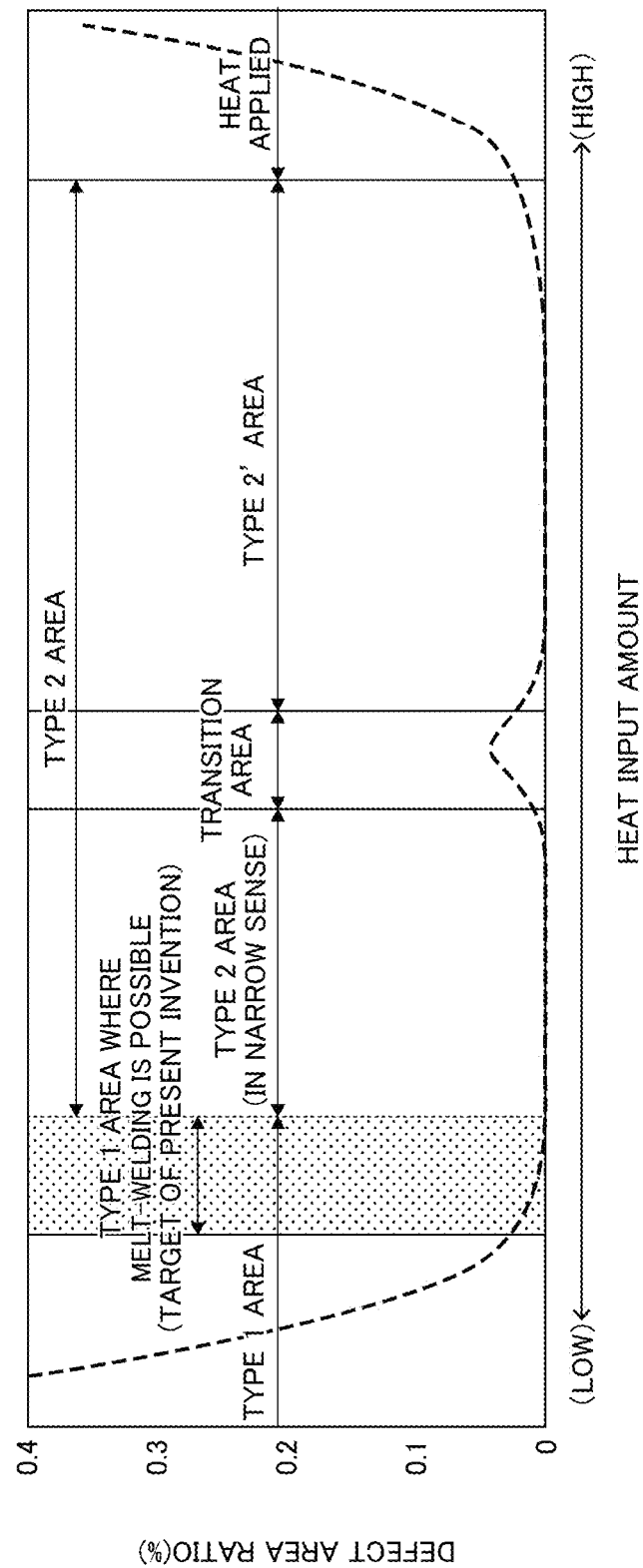
FIG. 21 is a diagram showing classification according to a level of the heat input amount, and the horizontal axis represents heat input amount while the vertical axis represents defect area ratio.
Figure 22:
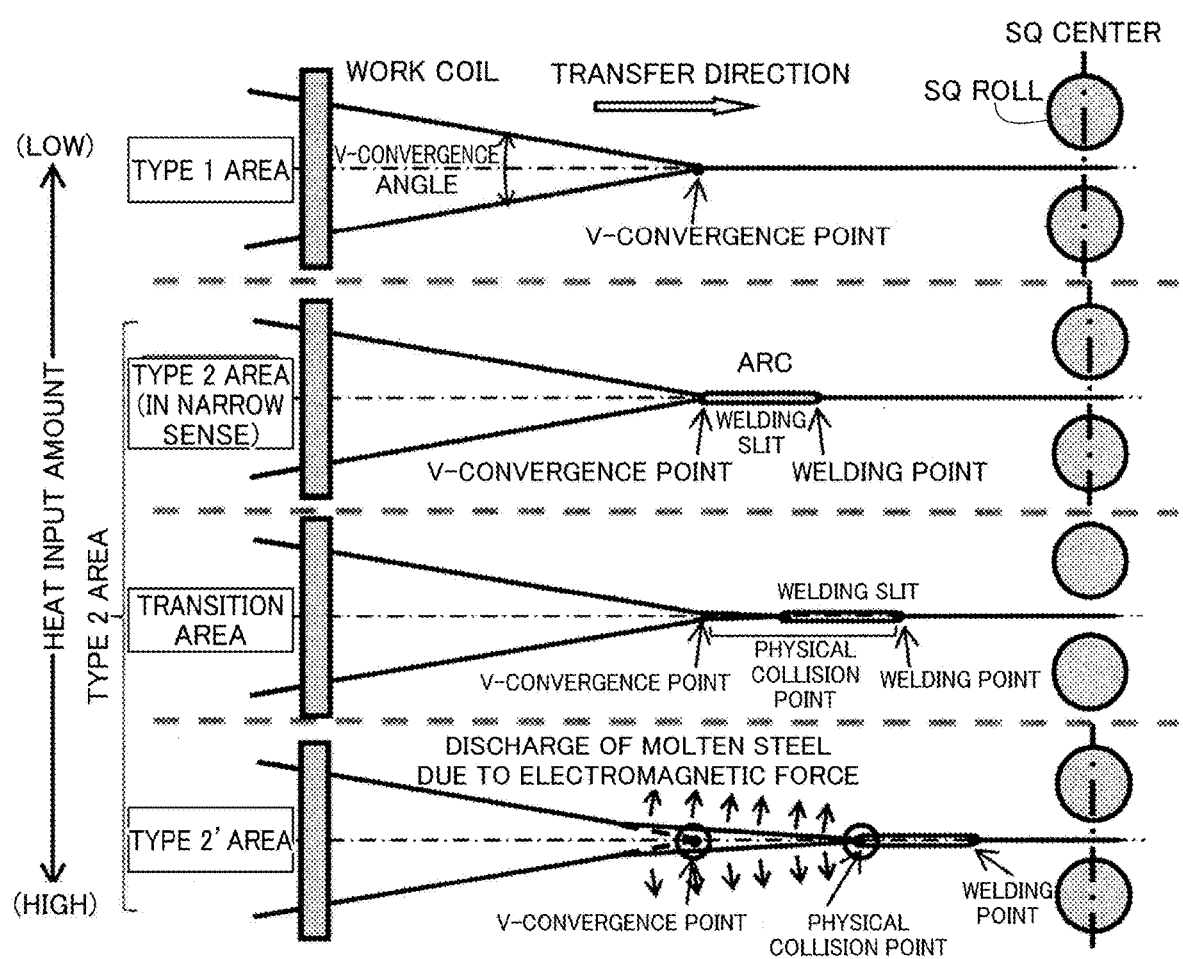
FIG. 22 is a diagram showing differences in welding phenomena observed in a type 1 area, a type 2 area in a narrow sense, a transition area, and a type 2' area.

In the present embodiment, it is comprehensively determined whether cold welding has occurred using the algorithm in FIG. 6 described in the first embodiment and the algorithm in FIG. 16 described in the second embodiment in combination. That is, in the present embodiment, both determination of whether cold welding has occurred based on the distance l1 from the V-convergence point v1 to the position where molten steel starts to be discharged i1 and determination of whether cold welding has occurred based on the molten width w1 are performed. Then, when these two determination results match, it is determined that determination of whether cold welding has occurred has been correctly performed. On the other hand, when these two determination results do not match, it is determined that determination of whether cold welding has occurred has not been correctly performed. A specific example thereof will be described below using the algorithm shown in FIG. 20.

In this process, first, in Step S01C, a V convergence portion and a V-convergence point v1, and the welding portion W including a position where molten steel starts to be discharged i1 from the inside of the wall thickness and an edge detection area are imaged by the camera 11 to obtain a captured image.

In the following Step S02C, a red component is extracted from the captured image. A red component is extracted from the captured image. Here, regarding the extraction component, a green component or a blue component may be used in place of the red component. However, the green component is preferable to the blue component due to high light sensitivity. In addition, the red component is preferable to the green component. Therefore, the red component is most preferable as the extraction component.

In the following Step S03C, approximation straight lines of the butt end surfaces (the pair of welded surface edges) e1 and e2 are detected. In this case, an edge detection area is predetermined so that it is not easily affected by the low brightness portion on the upstream side and the vicinity of the V-convergence point. In this example, as shown in FIG. 7 in the first embodiment, 20% of each of the upstream end and the downstream end of the wedge-shaped area surrounded by the butt end surfaces e1 and e2 is excluded, and a pair of approximation straight lines are detected from thereabove.

In the following Step S04C, the intersection between the pair of approximate lines obtained in Step S03C is detected as a V-convergence point v1.

In the following Step S05C, a re-binarization area is set downstream from the V-convergence point v1. For example, as in the example shown in FIGS. 8(a) and 8(b) in the first embodiment, a rectangular range of 2 mm in the circumferential direction (a vertical direction of the surface of the image) and 10 mm in the longitudinal direction can be set as an area in which re-binarization is performed from this.

In the following Step S06C, the area set in Step S05C is re-binarized. The threshold value for performing the re-binarization is the same as that in the first embodiment described with reference to FIGS. 9(a) and 9(b).

After Step S06C, a first process of performing Step S08C to S12C via Step S07C and a second process of performing Step S13C to Step S16C via Step S07C are performed in parallel.

First, in the first process, in Steps S07C and S08C, a high brightness area is extracted by labeling the area re-binarized in Step S06C. At this stage, blobs (in the first embodiment, white areas shown in FIGS. 8(a) and 8(b)) in contact with the left end of the re-binarization area are extracted in order to obtain an accurate target area.

In the following Step S09C, the distance l1 from the V-convergence point v1 to the position where molten steel starts to be discharged (the most downstream coordinates of the blob) i1 is calculated.

In the following Step S10C, it is determined whether cold welding or normal by comparing the distance l1 obtained in Step S09C with a determination threshold value. That is, when the distance l1 is equal to or larger than a determination threshold value (Yes), the process proceeds to Step S11C, and "primary determination=no cold welding" is determined. On the other hand, when the distance is less than a determination threshold value (No), the process proceeds to Step S12C, and "primary determination=cold welding" is determined.

Then, in the second process, in Steps S07C and S13C, a high brightness area is extracted by labeling the area re-binarized in Step S06C. In this case, blobs (in the second embodiment, white areas in FIGS. 17(a) and 17(b) detected as a mass in labeling processing) in contact with the left end of the re-binarization area are extracted in order to obtain an accurate target area. Then, the molten width w1 of the high brightness area is measured.

In the following Step S14C, it is determined whether cold welding or normal by comparing the molten width w1 obtained in Step S13C with a determination threshold value. That is, when the molten width w1 is equal to or larger than a determination threshold value (Yes), the process proceeds to Step S15C, and "secondary determination=no cold welding" is determined. On the other hand, when the molten width w1 is less than a determination threshold value (No), the process proceeds to Step S16C, and "secondary determination=cold welding" is determined.

The result of the primary determination and the result of the secondary determination described above are introduced in Step S17C, and when the determination results match (Yes), the process proceeds to Step S18C, and it is determined that "there is no determination abnormality." On the other hand, when the determination results do not match (No), the process proceeds to Step S19C, and it is determined that "there is a determination abnormality." In this case, it can be determined that some defects (for example, cooling water has been applied to the imaging range, a foreign substance has entered, or the like) have occurred and the reliability of the determination result has been impaired.

The control flow after Steps S18C and S19C returns to Step S01C, and the above steps are repeated again. Here, the process proceeds to Step S19C, and when it is determined that "there is a determination abnormality," this may be stored and used for later reliability determination or an alarm may be displayed to notify the operator.

While the first embodiment to the third embodiment of the present invention have been described above in detail with reference to the drawings, the present invention is not limited to these embodiments. The outline of the present invention is as follows.

(1) A method for monitoring welding of an electric resistance welded steel pipe according to each embodiment of the present invention includes: an image acquisition step in which, when an electric resistance welded steel pipe is welded, a V-convergence portion including an edge detection area and a V-convergence point v1, and a welding portion W including a position where molten steel starts to be discharged i1 from the inside of a wall thickness and a bead, are imaged to obtain a captured image; a determination information acquisition step in which the captured image is image-processed, and a molten length l1 from the V-convergence point v1 to the position where molten steel starts to be discharged i1 or a molten width w1 of the welding portion W or combination thereof is acquired as determination information; and a determining step in which it is determined whether cold welding has occurred by comparing the determination information with a determination threshold value set in advance for each wall thickness of the electric resistance welded steel pipe.

(2) in the method for monitoring welding of an electric resistance welded steel pipe according to (1), in the determination information acquisition step, the molten length l1 may be acquired as the determination information.

(3) In the method for monitoring welding of an electric resistance welded steel pipe according to (2), in the image processing in the determination information acquisition step, a high brightness area may be extracted by labeling an area downstream from the V-convergence point v1 and the molten length l1 may be then acquired.

(4) In the method for monitoring welding of an electric resistance welded steel pipe according to (2) or (3), the following may be applied: the wall thickness of the electric resistance welded steel pipe is 4.0 mm to 6.0 mm; and in the determining step, a result of whether the molten length l1 is 1.5 mm or more is used as the determination threshold value.

(5) In the method for monitoring welding of an electric resistance welded steel pipe according to any one of (2) to (4), the determination threshold value in the determining step may be provided for each product type of the electric resistance welded steel pipe.

(6) In the method for monitoring welding of an electric resistance welded steel pipe according to (1), in the determination information acquisition step, the molten width w1 may be acquired as the determination information.

(7) In the method for monitoring welding of an electric resistance welded steel pipe according to (6), in the image processing in the determination information acquisition step, a high brightness area may be extracted by labeling an area downstream from the V-convergence point v1 and the molten width w1 may be then acquired.

(8) In the method for monitoring welding of an electric resistance welded steel pipe according to (6) or (7), the following may be applied: the wall thickness of the electric resistance welded steel pipe is 4.0 mm to 6.0 mm; and in the determining step, a result of whether the molten width w1 is 0.3 mm or more is used as the determination threshold value.

(9) In the method for monitoring welding of an electric resistance welded steel pipe according to any one of (6) to (8), the determination threshold value in the determining step may be provided for each product type of the electric resistance welded steel pipe.

(10) A method for manufacturing an electric resistance welded steel pipe by molding a strip steel sheet into an open pipe OP while sending the strip sheet in a longitudinal direction and welding a gap between a pair of butt end surfaces e1 and e2, according to an aspect of the present invention includes performing the welding between a heat input lower limit operation condition in which a cold welding is not reached, which is obtained by the method for monitoring welding of an electric resistance welded steel pipe according to any one of (1) to (9), and a heat input upper limit operation condition in which no welding slit is generated on a downstream from the V-convergence point.

(11) The method for manufacturing an electric resistance welded steel pipe according to (10) may further include a marking step in which, when it is determined in the determining step that cold welding has occurred, a position on the electric resistance welded steel pipe corresponding to the cold welding is marked.

(12) A device 10 for monitoring welding of an electric resistance welded steel pipe, according to an aspect of the present invention includes: an imaging unit configured to image, when an electric resistance welded steel pipe is welded, a V-convergence portion including an edge detection area and a V-convergence point v1, and a welding portion W including a position where molten steel starts to be discharged i1 from an inside of a wall thickness and a bead, to obtain a captured image; a determination information acquisition unit configured to perform image processing on the captured image and acquire a molten length l1 from the V-convergence point v1 to the position where the molten steel starts to be discharged i1 or a molten width w1 of the welding portion W or a combination thereof as a determination information; and a determination unit configured to determine whether a cold welding has occurred by comparing the determination information with a determination threshold value set in advance for each wall thickness of the electric resistance welded steel pipe.

(13) In the device for monitoring welding of an electric resistance welded steel pipe 10 according to (12), the determination information may be the molten length l1.

(14) In the device for monitoring welding of an electric resistance welded steel pipe 10 according to (13), the determination information acquisition unit may extract a high brightness area by labeling an area downstream from the V-convergence point v1 and then acquire the molten length l1.

(15) In the device for monitoring welding of an electric resistance welded steel pipe 10 according to (13) or (14), the following may be applied: the wall thickness of the electric resistance welded steel pipe is 4.0 mm to 6.0 mm; and the determination unit uses a result of whether the molten length l1 is 1.5 mm or more as the determination threshold value.

(16) In the device for monitoring welding of an electric resistance welded steel pipe 10 according to any one of (13) to (15), the determination unit may have the determination threshold value for each product type of the electric resistance welded steel pipe.

(17) In the device for monitoring welding of an electric resistance welded steel pipe 10 according to (12), the determination information may be the molten width w1.

(18) In the device for monitoring welding of an electric resistance welded steel pipe 10 according to (17), the determination information acquisition unit may extract a high brightness area by labeling an area downstream from the V-convergence point v1 and then acquire the molten width w1.

(19) In the device for monitoring welding of an electric resistance welded steel pipe 10 according to (17) or (18), the following may be applied: the wall thickness of the electric resistance welded steel pipe is 4.0 mm to 6.0 mm; and the determination unit uses a result of whether the molten width w1 is 0.3 mm or more as the determination threshold value.

(20) In the device for monitoring welding of an electric resistance welded steel pipe according to any one of (17) to (19), the determination unit may have the determination threshold value for each product type of the electric resistance welded steel pipe.

(21) A device for manufacturing an electric resistance welded steel pipe by molding a strip steel sheet into an open pipe while sending the strip steel sheet in a longitudinal direction and welding a gap between a pair of butt end surfaces e1 and e2, according to an aspect of the present invention includes: the device for monitoring welding of an electric resistance welded steel pipe 10 according to any one of (12) to (20); and a control device 20 configured to regulate a heat input amount during the welding between a heat input lower limit operation condition in which the cold welding is not reached and a heat input upper limit operation condition in which no welding slit is generated downstream from the V-convergence point v1.

(22) The device for manufacturing an electric resistance welded steel pipe according to (21) may further include a marking unit configured to, when the determination unit determines that cold welding has occurred, mark a position on the electric resistance welded steel pipe corresponding to the cold welding.

INDUSTRIAL APPLICABILITY

According to the present invention, it is possible to provide a method for monitoring welding of an electric resistance welded steel pipe and a device for monitoring welding of an electric resistance welded steel pipe through which cold welding can be detected in order to appropriately perform a welding operation in a type 1 area where melt-welding is possible. In addition, according to the present invention, it is possible to provide a method for manufacturing an electric resistance welded steel pipe using the method for monitoring welding of an electric resistance welded steel pipe, and a device for manufacturing an electric resistance welded steel pipe including the device for monitoring welding of an electric resistance welded steel pipe.

Brief Description of the Reference Symbols

10 Device for monitoring welding of electric resistance welded steel pipe

11 Camera (imaging unit)
20 Control device
e1, e2 Pair of butt end surfaces
i1 Position where molten steel starts to be discharged
l1 Molten length
OP Open pipe
v1 V-convergence point
W Welding portion
w1 Molten width

The invention claimed is:

1. A method for monitoring welding of an electric resistance welded steel pipe, wherein the welding includes using a heating unit to heat a portion of the pipe to melt a pair of facing butt end surfaces, the method comprising:
   an image acquisition step including capturing, via a camera, a captured image of the electric resistance welded steel pipe while welding the electric resistance steel pipe, the captured image including a V-convergence portion including an edge detection area and a V-convergence point, and a welding portion including a position where a molten steel starts to be discharged from an inside of a wall thickness and a bead;
   a determination information acquisition step including image-processing the captured image to obtain determination information, and acquiring, as part of the determination information, a molten length from the V-convergence point to the position where the molten steel starts to be discharged, a molten width of the welding portion, or both the molten length and the molten width;
   a determining step including comparing the determination information with a determination threshold value set in advance for each wall thickness of the electric resistance welded steel pipe, and determining whether cold welding has occurred, the cold welding being a welding state in which a full thickness of the welding portion in the wall thickness direction has not melted and a partially un-melted portion remains; and
   a controlling step including controlling, via a control device, the heating unit based on a result of the determining step.

2. The method for monitoring welding of an electric resistance welded steel pipe according to claim 1, wherein, in the determination information acquisition step, the molten length is acquired as the determination information.

3. The method for monitoring welding of an electric resistance welded steel pipe according to claim 2, wherein, in the image processing in the determination information acquisition step, a high brightness area is extracted by labeling an area downstream from the V-convergence point, and the molten length is then acquired, the high brightness area being an area located on a side downstream from the V-convergence point and has a high brightness in a view seen from above the area.

4. The method for monitoring welding of an electric resistance welded steel pipe according to claim 2:
   wherein the wall thickness of the electric resistance welded steel pipe is 4.0 mm to 6.0 mm, and
   wherein, in the determining step, the determination threshold value for the molten length is 1.5 mm.

5. The method for monitoring welding of an electric resistance welded steel pipe according to claim 2, wherein the determination threshold value in the determining step is provided for each product type of the electric resistance welded steel pipe.

6. The method for monitoring welding of an electric resistance welded steel pipe according to claim 1, wherein, in the determination information acquisition step, the molten width is acquired as the determination information.

7. The method for monitoring welding of an electric resistance welded steel pipe according to claim 6, wherein, in the image processing in the determination information acquisition step, a high brightness area is extracted by labeling an area downstream from the V-convergence point, and the molten width is then acquired, the high brightness area being an area located on a side downstream from the V-convergence point and has a high brightness in a view seen from above the area.

8. The method for monitoring welding of an electric resistance welded steel pipe according to claim 6,
   wherein the wall thickness of the electric resistance welded steel pipe is 4.0 mm to 6.0 mm, and
   wherein, in the determining step, the determination threshold value for the molten width is 0.3 mm.

9. The method for monitoring welding of an electric resistance welded steel pipe according to claim 6, wherein the determination threshold value in the determining step is provided for each product type of the electric resistance welded steel pipe.

10. A method for manufacturing an electric resistance welded steel pipe by molding a strip steel sheet into an open pipe while sending the strip steel sheet in a longitudinal direction and welding a gap between a pair of butt end surfaces, comprising:
    performing the welding between:
       a heat input lower limit operation condition in which a cold welding is not reached, which is obtained by the method for monitoring welding of an electric resistance welded steel pipe according to claim 1, and
       a heat input upper limit operation condition in which no welding slit is generated on a downstream from the V-convergence point,
    wherein the cold welding is a welding state in which a full thickness of the welding portion in the wall thickness direction has not melted and a partially un-melted portion remains.

11. The method for manufacturing an electric resistance welded steel pipe according to claim 10, further comprising:
    a marking step of marking on the electric resistance welded steel pipe at a position where the cold welding has occurred.

12. A device for monitoring welding of an electric resistance welded steel pipe, comprising:
    an imaging unit configured to image, when an electric resistance welded steel pipe is welded, a V-convergence portion including an edge detection area and a V-convergence point, and a welding portion including a position where a molten steel starts to be discharged from an inside of a wall thickness and a bead, to obtain a captured image;
    a determination information acquisition unit configured to perform image processing on the captured image and acquire a molten length from the V-convergence point to the position where the molten steel starts to be discharged or a molten width of the welding portion or a combination thereof as a determination information; and
    a determination unit configured to determine whether a cold welding has occurred by comparing the determination information with a determination threshold value set in advance for each wall thickness of the electric resistance welded steel pipe, wherein the cold welding is a welding state in which a full thickness of the welding portion in the wall thickness direction has not melted and a partially un-melted portion remains.

13. The device for monitoring welding of an electric resistance welded steel pipe according to claim 12, wherein the determination information is the molten length.

14. The device for monitoring welding of an electric resistance welded steel pipe according to claim 13, wherein the determination information acquisition unit acquires the molten length after a high brightness area is extracted by labeling an area downstream from the V-convergence point, the high brightness area being an area located on a side downstream from the V-convergence point and has a high brightness in a view seen from above the area.

15. The device for monitoring welding of an electric resistance welded steel pipe according to claim 13,
wherein the wall thickness of the electric resistance welded steel pipe is 4.0 mm to 6.0 mm, and
wherein the determination threshold value for the molten length is 1.5 mm.

16. The device for monitoring welding of an electric resistance welded steel pipe according to claim 13, wherein the determination unit has the determination threshold value for each product type of the electric resistance welded steel pipe.

17. The device for monitoring welding of an electric resistance welded steel pipe according to claim 12, wherein the determination information is the molten width.

18. The device for monitoring welding of an electric resistance welded steel pipe according to claim 17, wherein the determination information acquisition unit acquires the molten width after a high brightness area is extracted by labeling an area downstream from the V-convergence point, the high brightness area being an area located on a side downstream from the V-convergence point and has a high brightness in a view seen from above the area.

19. The device for monitoring welding of an electric resistance welded steel pipe according to claim 17,
wherein the wall thickness of the electric resistance welded steel pipe is 4.0 mm to 6.0 mm, and
wherein the determination threshold value for the molten width is 0.3 mm.

20. The device for monitoring welding of an electric resistance welded steel pipe according to claim 17, wherein the determination unit has the determination threshold value for each product type of the electric resistance welded steel pipe.

21. A device for manufacturing an electric resistance welded steel pipe by molding a strip steel sheet into an open pipe while sending the strip steel sheet in a longitudinal direction and welding a gap between a pair of butt end surfaces, the device comprising:
the device for monitoring welding of an electric resistance welded steel pipe according to claim 12; and
a control device configured to regulate a heat input amount during the welding between:
a heat input lower limit operation condition in which the cold welding is not reached and
a heat input upper limit operation condition in which no welding slit is generated downstream from the V-convergence point.

22. The device for manufacturing an electric resistance welded steel pipe according to claim 21, further comprising:
a marking unit configured to, when the determination unit determines that the cold welding has occurred, mark a position on the electric resistance welded steel pipe corresponding to the cold welding.

* * * * *